US008332645B2

(12) United States Patent
Dolev et al.

(10) Patent No.: US 8,332,645 B2
(45) Date of Patent: Dec. 11, 2012

(54) METHOD, APPARATUS AND PRODUCT FOR RFID AUTHENTICATION

(75) Inventors: Shlomi Dolev, Omer (IL); Marina Kopeetsky, Ashdod (IL); Adi Shamir, Rehovot (IL)

(73) Assignees: Yeda Research and Development Co. Ltd, Rehovot (IL); Sami Shamoon College of Engineering, Beer Sheva (IL); Shlomi Dolev, Omer (IL)

( * ) Notice: Subject to any disclaimer, the term of this patent is extended or adjusted under 35 U.S.C. 154(b) by 922 days.

(21) Appl. No.: 12/440,739

(22) PCT Filed: Sep. 11, 2007

(86) PCT No.: PCT/US2007/078167
§ 371 (c)(1),
(2), (4) Date: Mar. 11, 2009

(87) PCT Pub. No.: WO2008/033843
PCT Pub. Date: Mar. 20, 2008

(65) Prior Publication Data
US 2009/0225985 A1 Sep. 10, 2009

Related U.S. Application Data

(60) Provisional application No. 60/843,420, filed on Sep. 11, 2006, provisional application No. 60/929,722, filed on Jul. 10, 2007.

(51) Int. Cl.
H04L 29/06 (2006.01)
(52) U.S. Cl. .......................... 713/172; 713/181
(58) Field of Classification Search .................. None
See application file for complete search history.

(56) References Cited

U.S. PATENT DOCUMENTS
5,774,065 A 6/1998 Mabuchi et al.
(Continued)

FOREIGN PATENT DOCUMENTS
WO 2006/075150 A1 7/2006

OTHER PUBLICATIONS

International Search Report published May 29, 2008 for PCT/US2007/078167 filed Sep. 11, 2007.
International Preliminary Report on Patentability published Mar. 17, 2009 for PCT/US07/78167, filed Sep. 11, 2007.
Written Opinion published Mar. 11, 2009 for PCT/US07/78167, filed Sep. 11, 2007.

(Continued)

Primary Examiner — Gilberto Barron, Jr.
Assistant Examiner — Izunna Okeke
(74) Attorney, Agent, or Firm — Martin Fleit; Paul D. Bianco; Fleit Gibbons Gutman Bongini & Bianco PL

(57) ABSTRACT

A method and apparatus for repeated communication sessions between a sender (e.g., RFID tag) and a receiver (RFID reader) that employs a proactive information security scheme is based on the assumption that the information exchanged during at least one of every n successive communication sessions is not exposed to an adversary. The sender and the receiver maintain a vector of n entries that is repeatedly refreshed by pairwise XORING entries, with a new vector of n entries that is randomly chosen by the sender and sent to the receiver as a part of each communication session. Also, a computational secure scheme based on the information secure scheme is employed to ensure that even in the case that the adversary listens to all the information exchanges, the communication between the sender and the receiver is secure. In particular, the scheme can be used in the domain of remote controls (e.g., for cars).

37 Claims, 8 Drawing Sheets

U.S. PATENT DOCUMENTS

| | | | |
|---|---|---|---|
| 6,396,389 B1 | 5/2002 | Nakano et al. | |
| 6,882,737 B2 | 4/2005 | Lofgren et al. | |
| 2004/0222878 A1* | 11/2004 | Juels | 340/10.1 |
| 2008/0042804 A1 | 2/2008 | Burbridge | |

OTHER PUBLICATIONS

Corrected Written Opinion of the International Searching Authority mailed Feb. 13, 2009 for PCT/US07/78167 filed Sep. 11, 2007.

* cited by examiner

Step 1

$$(b_{11} \ldots \ldots \ldots b_{1n})$$

$$\begin{pmatrix} a_{11} & \cdots & \cdots & \cdots & a_{1n} \\ \vdots & \cdots & \vdots & \cdots & \vdots \\ \vdots & \cdots & \vdots & \cdots & \vdots \\ a_{n-11} & \cdots & \vdots & \cdots & a_{n-1,n} \\ a_{n,1} & \cdots & \cdots & \cdots & a_{nn} \end{pmatrix}$$

Step 2

$$(b_{21} \ldots \ldots \ldots b_{2n})$$

$$\begin{pmatrix} b_{11} & \cdots & \cdots & b_{1n-1} & b_{1n} \\ \vdots & \cdots & \vdots & \cdots & \vdots \\ \vdots & \cdots & \vdots & \cdots & \vdots \\ a_{n-21} & \cdots & \vdots & a_{n-2n-1} & a_{n-2n} \\ a_{n-11} & \cdots & \cdots & a_{n-1n-1} & a_{n-1n} \end{pmatrix}$$

FIG. 1A Operation of Proactive Information Secure Protocol.

Step 1

$$(b_{11} \ldots \ldots \ldots b_{1n})$$

$$(a_{11} \ldots \ldots \ldots |a_{1n}|)$$

Step 2

$$(b_{21} \ldots \ldots \ldots b_{2n-1} \quad b_{2n},)$$

$$(a_{11} \oplus b_{11} \ldots \ldots |a_{1n-1} \oplus b_{1n-1}|b_{1n})$$

FIG. 1B Operation of Proactive Information Secure Protocol.

| Protocol for RFID Sender | Protocol for RFID Receiver |
|---|---|
| 1: Initialization: <br> 2: Create int array $B = a[1..n]$ <br> 3: int $i := 1$; <br>    $keyentry = n - (i - 1)\ mod\ n$ <br> 4: Upon user request <br> 5:    Create new random array b <br> 6:    $X = a[keyentry]$ <br> 7:    Send $s = (X,b)$ to Receiver <br> 8:    Call Updating procedure <br> 9: End user request <br> <br> u1: Updating procedure <br> u2:    $a[keyentry] = 0$ <br> u3:    for $(j = 1; j++; j < n)$ <br> u4:        $a[j] = a[j] \oplus b[j]$ <br> u5:    $i := i + 1$ | 1: Initialization <br> 2: Create int array $B = a[1..n]$ <br> 3: int $i := 1$; <br>    $keyentry = n - (i - 1)\ mod\ n$ <br> 4: Upon reception of key message <br> 5:    if $X = a[keyentry]$ <br> 6:        Send *Open to Sender* and <br>        Call Updating procedure <br> 7:    else Send *DoNotOpen* <br>        to Sender <br> 8: End of key message reception |

FIG. 2 Proactive Information Secure Protocol.

| Protocol for RFID Sender | Protocol for RFID Receiver |
|---|---|
| 1: *Initialization:*<br>2: Create int vector array $B = a[1..n]$<br>3: int $i := 1$; *send* := 0<br>4: int vector array *keywords*<br><br>5: Upon user request<br>6:    Create new random array b<br>7:    *keyentry* = n – ($i$ - 1)*mod* n<br>8:    X[*keyentry*] = a[*keyentry*]<br>9:    Create pseudo-random sequence<br>10:    *prs* of length $m$ from<br>11:    seed = X[*keyentry*] ⊕ seed<br>12:    Y = (b‖*keyword*) ⊕ *prs*<br>13:    Send Y to Receiver<br>14:    Call *Updating procedure*<br>15: End user request<br><br>u1: *Updating procedure*<br>u2:    a[*keyentry*] = 0<br>u3:    for ($j$ = 1; $j$++; $j$ < n)<br>u4:       a[$j$] = a[$j$] ⊕ b[$j$]<br>u5:    $i := i + 1$ | 1: *Initialization*<br>2: Create int vector array $B = a[1..n]$<br>3: int $i := 1$; *seed* := 0<br>4: int vectory arrays *keywords*<br><br>5: Upon key message Y reception<br>6:    *keyentry* = n – ($i$ - 1)*mod* n<br>7:    Create pseudo-random sequence<br>8:    *prs* of length $m$ from<br>9:    seed = X[*keyentry*] ⊕ seed<br>10:    Z = Y ⊕ *prs*<br>11:    if Z[(n + 1), m] ∈ *keywords*<br>12:       send *Open* to Sender and<br>13:       Call *Updating procedure*<br>14:    Else<br>15:       send *DoNotOpen* to Sender<br>16: End of key message reception |

FIG. 3 Proactive Computational Secure Protocol.

SENDER (S)

RECEIVER (R)

METHOD, APPARATUS AND PRODUCT FOR RFID AUTHENTICATION

BACKGROUND OF THE INVENTION

1. Field of the Invention

The present invention relates to a method, apparatus and product for RFID authentication having efficient proactive information security within computational security.

2. Prior Art

An RFID tag is a small microchip, supplemented with an antenna that transmits a unique identifier in response to a query by a reading device. RFID technology is designed for the unique identification of different kinds of objects. According to [14] RFID communication systems are composed of three major elements: (i). a RFID tag carries object identifying data; (ii). a RFID reader interfaces with tags to read or write tag data; (iii). a back-end database aggregates and utilizes tag data collected by readers. The RFID sender (or reader) broadcasts an RF signal to access data stored on tags that usually includes a unique identification number. RFID tags are designed as low cost devices that use cheap radio transmission media. Such tags have no or very limited internal source of power; nevertheless, they receive their power from the reading devices. The range of the basic tags transmission is up to several meters. Possible applications of the RFID devices include: RFID-enabled banknotes, libraries, passports, pharmaceutical distribution of drugs, and organization of an automobile security system or any key-less entry system. Nevertheless, the wide deployment of RFID tags may cause new security and privacy protecting issues.

RFID tags usually operate in insecure environment. The RFID reader privacy may be compromised by an adversary that extracts unencrypted data from the unprotected tags. RFID tags are limited devices that cannot support complicated cryptographic functions. Hence, there is nowadays an interest in achieving high security and privacy level for the RFID devices, without usage of computationally expensive encryption techniques.

A brief introduction to RFID technology appears in [14] where potential security and privacy risks are described. Schemes for providing desired security properties in the unique setting of low-cost RFID devices are discussed in [14]. The authors of [14] depict several advantages of the RFID tags over traditional optical bar codes. Unlike the optical bar codes, RFID tags are able to read data automatically through non-conducting material at a rate of several hundred tags per second and to a distance of several meters up to hundred meters. The authors state that low-cost smart RFID tags may become an efficient replacement for optical bar codes. The main security risks stated are the violations of "location privacy" and denial of service that disable the tags. With the RFID resource constraints in mind, the cryptography techniques proposed in developing the RFID security mechanisms are: (i) a simple access mechanism based on hardware-efficient one-way hash functions, low-cost traditional symmetric encryption schemes, randomizing tag responses based on random number generator; (ii). integrating RFID systems with a key management infrastructure. Regardless of the mechanisms used for privacy and access control, management of tag keys is an important issue. The new challenge in the RFID system design is to provide access control and key management tools compatible with the tags cost constraints.

A research survey in [10] examines different proposed approaches for providing privacy protection and integrity assurance in RFID systems. In order to define the notions of "secure" and "private" for RFID tags a formal model that characterizes the capabilities of potential adversaries is proposed. The author states that it is important to adapt RFID security models to cope with the weakness of the RFID devices. Few weak security models that reflect real threats and tag capabilities are discussed. A "minimalist" security model that serves low-cost tags is introduced in [11]. The basic model assumption is that the potential RFID adversary is weaker than the one in traditional cryptography. Besides, such an adversary comes into scanning range of a tag only periodically. The minimalist model aims to take into account the RFID adversary characteristics. Therefore, this model is not perfect, but it eliminates some of the standard cryptographic assumptions that may be not appropriate for the deployment in other security systems that are based on a more powerful adversary model. The author of [11] states that standard cryptographic functionality is not needed to achieve necessary security in RFID tags.

An adversary model adapted to RFID protocols is introduced in [1]. Many existing privacy protecting RFID protocols are examined for their traceability. Traceability is defined as the capability of the adversary to recognize a tag which the adversary has already seen, at another time or in another location [1]. The traceability is stated as a serious problem related to the privacy protection in the RFID systems. The paper concludes that in a realistic model, many protocols are not resistant to traceability.

The Newsletter of the RFID Society [8] proposes zero-knowledge proofs technology in solving the privacy issue for RFID. The main idea is to enhance RFID chips with additional cryptographic functions supporting zero knowledge identity proofs. This approach requires a large amount of memory and long computational time. Basic RFID tags are low-memory devices and are not capable to store and process large amount of data.

Other existing techniques and secure protocols proposed for implementation in existing RFID systems include an inexpensive RFID tag known as Electronic Product Code (EPC) tag, which was developed to protect against RFID tag cloning [9]. Although basic EPC tags possess features geared toward privacy protection and access control mechanisms, notwithstanding they do not possess explicit authentication functionality. That is, EPC standards prescribe no mechanism for RFID-EPC readers to authenticate the validity of the tags they scan, The authors show how to construct tag-to-reader and reader-to-tag authentication protocols.

However, the security analysis of the basic Digital Signature Transponder (DST) RFID tags is described in [3]. The authors also present in detail the successful strategy for defeating the security of an RFID device known as DST. The main conclusion of [3] is that basic DST tags are no longer secure due to the tags weakness caused by the inadequate short key length of 40 bits. Although it is possible to increase the computational security level by increasing the length of the key, still the resulting scheme will not be information secure but only computationally secure.

SUMMARY OF THE INVENTION

The object of the present invention is to provide a method and apparatus for secure authentication of basic passive RFID tags. This is accomplished by a method and apparatus that includes new proactive and cost effective information and computationally secure authentication protocols for RFIDs. The main object is one-sided authentication, where the receiver has to identify the sender. Such (non-mutual) one-sided authentication is useful in applications in which the sender may have other means to identify (that it is communicating with) the desired receiver (say, by being geographically close to the receiver). The method and apparatus can also include a symmetric authentication scheme to obtain mutual authentication. The method and apparatus is also appropriate to a protocol that copes with an intruder-in the middle-attack (IIMA) as a modification of the basic computationally secure protocol.

The method and apparatus of the present invention provides a proactive information secure scheme within computational secure scheme. This is accomplished by maintaining a matrix of $n^2$ numbers or using a vector of n such numbers. Given the memory restrictions of RFIDs such an improvement is of great importance. In addition the method and apparatus of the invention employs a new algorithm that uses randomization in order to reduce the communication during a session from O(n) numbers to O(log n) numbers. This randomized solution is designed for the case in which the adversary does not listen in $k \geq 1$ sessions among any n successive communication sessions. The randomized scheme uses only O(n log n) new random numbers in every n successive communication session when k is bounded by a constant fraction of n.

The method and apparatus of the invention also includes a new way to use water-marks technique to cope with IIMA even for the case when there is only one message sent during a communication session (unlike [11, 7] where the exchange of three messages is required). The method and apparatus is based on expanding each message to be a codeword with error correcting bits, thus, forcing an attacker to change at least a number of bits that is equal to the minimal Hamming distance between two codewords, and not to corrupt the inserted watermarks. In addition watermarks bits are produced by pseudo-random sequence and inserted in the message in specific locations defined by pseudo-random sequences. The operations for producing water-marked messages are based only on XOR operations and the usage of pseudo random sequences.

Accordingly, a principal object of the invention is to provide a method and apparatus that employ new algorithms for providing authentication for computationally limited basic RFID systems with a small amount of storage capability. The invention provides a new security protecting model that is informational and computationally secure. The security power of the basic and combined authentication protocols employed in the method and apparatus of the invention is provided by maintaining at the sender and the receiver's sides n-dimensional vector B. The appropriate vector-entry is used as the secret key for performing the authentication procedure by the RFID. The vector B is updated by its XOR with a randomly chosen new n dimensional vector at any communication session.

The basic information secure protocol $AP_1$ employed by the inventive method and apparatus is based on the limited adversarial capabilities. The underlining assumption of this protocol is that the adversary is not listening in at least one of each n successive interaction between the sender and the receiver. In essence, this protocol constitutes a "minimalist" security model as defined in [11]. The underlying assumption of the protocol $AP_1$ is that each communication session is atomic, that means that the adversary cannot modify part of the communication in a session. The adversary may either listen in to the communication during a session, or try to communicate (on behalf of the RFID sender) during an entire session. Compared with [11], the method and apparatus of the invention also works when it is not known explicitly which session the adversary is not listening in. Moreover, the security failure in a certain session does not bear on successful implementation of the next sessions since the algorithms of the method and apparatus of the invention are proactive.

The protocol assumes that if the adversary was not listening in at least for a single session among n consecutive sessions between the RFID sender and the RFID receiver the proposed protocol automatically becomes information and computationally secure and, therefore the original security level is established. Thus, an adversary that starts processing the communication information in order to break the computational based scheme will have to start from scratch after any session it did not listen in. This fact can be used, in turn, to reduce the number of random bits used with relation to an only computational secure scheme. Assume that there is some variance to the value of the number of successive sessions in which the adversary is not listening in. Assume further there is a larger definite upper bound, n' greater or equal to this number, that may depend on a stricter consideration, (say battery lifetime). Assuming that $AP_1$ uses a vector of length n it is possible to tune the computational security level to fit the need to secure the n'−n sessions in which the protocol is not information secure.

In one embodiment, the method and apparatus of the invention include a proactive information security scheme based on the assumption that the information exchanged during at least one of every n successive communication sessions is not exposed to an adversary. In one embodiment the sender and the receiver maintain identical n·n matrices, and an index i used for defining a column and a row in these matrices. In any communication session the bitwise XOR of the entries of the i'th column serves as the authentication key, and the i'th row is replaced by a vector of n randomly chosen numbers, chosen and transmitted by the sender to the receiver. Then i is incremented by 1 (operations are performed mod n). In a more memory efficient embodiment the scheme is based on maintaining only a vector of n entries that is refreshed by pairwise XOR-ing entries, with a new vector of n entries that is randomly chosen by the sender and sent to the receiver as a part of each communication session.

The general case in which the adversary does not listen in $k \geq 1$ sessions among any n successive communication sessions is also within the contemplation of the invention. It can be shown that there is an n·(k+1) lower bound for the deterministic version of the scheme. The lower bound is on the number of new random numbers usage during any n successive communication sessions. The invention also contemplates a randomized scheme that uses only logarithmic in n random numbers in each communication session, assuming the adversary does not listen in a bounded fixed portion of any n successive communication sessions.

The restriction imposed on the adversary is dropped in the embodiment of the invention that includes combined proactive computational secure protocol $AP_2$ that operates successfully even if the adversary has gotten access to any number of successive interactions between the sender and the receiver. $AP_2$ protocol does not follow the "minimalist model" proposed in [11]. In [6] there is an atomicity of session assumption. By an embodiment of the invention $AP_2$ or $AP_1$ are extended to a version $\tilde{AP}_2$ that does not rely on atomic sessions and is computationally resistant against active IIMAs [15]. This version of the proactive combined computational secure protocol has several advantages.

a. Low computational cost combined with a high security level. The algorithms employed in the method and apparatus of the invention continuously use a random numbers generator as a source for preserving the security level. Low computational power is required compared with the standard cryptographic techniques like stream and block ciphers.

b. Protocols' robustness. The proactive computational secure protocol is not based on the refreshing procedure as suggested in [11]. The refreshing procedure in [11] provides the complete initialization of the protocol's secure parameters on the assumption that the adversary is not listening in the refreshing session. Moreover, the trusted party or RFID verifier in [11] accesses the RFID system on a periodic basis refreshing the system. In contradistinction, the invention provides a high computational security level by involving a trusted party only during initialization.

c. Security system reliability. The protocol $AP_1$ does not rely on information concerning the specific session among consecutive n sessions the adversary was listening in and the sessions in which the adversary was not present (as [11] assumes).

d. Functionality in the proactive mode. According to [4] proactive security provides a method for maintaining the overall security of a system, even when individual components are repeatedly broken into and controlled by an attacker. The automated recovery of the security protocol is provided in the proactive security model [4]. Any listening adversary's success and consequent protocol's security failure do not affect further functionality of the protocol. Recovery from a failure (assuming nonfatal effect of failures) is automatic. That is to say, assuming that no fatal damage is caused when the adversary reveals the clear text the future communication security is established.

e. Possibility of proactive information security within computational security. The embodiment of the invention constituting the second protocol $AP_2$ assumes that if the adversary was not listening in at least for a single session among n consecutive sessions between the RFID sender and the RFID receiver, the proposed protocol automatically becomes information and computationally secure and, therefore the original security level is established.

f. High level of the computational resistance against active IIMAs. Security against IIMAs of the updated protocol $\tilde{AP}_2$ is achieved by means of the low cost XOR-based techniques of the redundant coding [16] and digital watermarking [2]. The techniques used by $\tilde{AP}_2$ loosen the assumption on the atomicity of any session. A protocol that is resistant to IIMAs is proposed in [11]. The protocol is based on the three-way mutual authentication procedure between the RFID tag and the RFID reader. The protocol's computational security power is achieved by means of one-time pads that encapsulate the secret keys, and by the constant keys updating in each communication session. Another such protocol that is based on three message exchanges in each session is proposed in [7]. This protocol is provable secure based on the hardness of the Learning Parity in the Presence of Noise problem. Compared with [11] and [7] the inventive $\tilde{AP}_2$ protocol can be used for one way authentication with only one message exchange for session, or two ways authentication using two messages. Thus, the scheme employed by the invention is also applicable in the cases in which the RFID reader cannot exchange messages with the RFID tag, for example in the scope of automobile or any other key-less entry system. The invention has application in several domains including remote keys, e.g., automobile security systems.

Accordingly it is an object to provide a method for maintaining secure communication between and RFID sender and an RFID reader comprising the steps of a. initializing both the reader and the sender with (i) an initial vector array B=a[1 . . . n], (ii) i=1 and (iii) a keyentry=n−(i−1)mod n;

b. creating by sender, responsive to one of receiving request and being powered, a new random array b;

c. calculating key message by sender as s=(X,b) and sending key message to receiver;

d. receiving key message by receiver and calculating if X=a[keyentry], and if so, sending positive message to sender, and if not so, sending negative message to sender; and e. initiating an action by the sender responsive to receiving a positive message.

The method can also include the further step updating sender and receiver with said new random array b, and/or the step of defining k bits (a small number much less than $2^k$) bits different commands keywords from the sender to the receiver that will be executed by the receiver upon the sender authentication. In the sequel, when no confusion is possible the keyword used in the presentation of the invention is Open, and DoNotOpen is used to refer to the situation in which the keyword is not a valid command. Also, the method can include the further step of sender creating a pseudo-random sequence prs of length m.

The method can also include the further step of sender initializing the integer seed to zero, calculating the pseudo-random sequence prs from seed=X[keyentry] $\oplus$ seed, Y=(b∥keyword)$\oplus$(prs), and sending to receiver; and calculating at receiver Z=Y$\oplus$prs; and determining if Z[(n+1) . . . m] $\in$keywords, and if so, sending positive message to sender, and if not so, sending negative message to sender.

The method can be modified so that the seed X is divided into four independent seeds $X_j^1$, $X^{j2}$, $X^{j3}$, and $X_j^4$, with each seed $X_j^k$, k=1, . . . 4, generating a corresponding pseudo-random sequence $c^{jk}$. Watermarks can be added to message sent to receiver. Further, the message sent to receiver can have the following structure $Y_j=\pi((b_j\|keyword)\oplus(c_1^{j1}, \ldots, c_m^{j1})\|(r_1, \ldots r_q)\oplus(c_1^{j2}, \ldots c_q^{j2})\|(w_1, \ldots, w_v))$. In the above formula and thereafter preferences of arithmetic and string operations, is first bit-wise XOR and then concatenation.

Here $\pi$ determines the pseudo-random permutation of the concatenated string $((b_j\|keyword)\oplus(c_1^{j1}, \ldots, c_m^{j1})\|(r_1, \ldots, r_q)\oplus(c_1^{j2}, \ldots, c_q^{j2})\|(w_1, \ldots, w_v))$, the random string $b_j$ concatenated with the keyword string, keyword extended by error detection redundancy bits $r_1, \ldots, r_q$ to form a legal codeword, and the pseudo-random sequence $c^{j2}$ being generated from the seed $X_j^2$ encapsulating the redundant bits $r_1, \ldots, r_{q_1}$, with the pseudo-random sequence $c^{j3}$ being generated from the seed $X_j^3$ determining the watermarks $w_1, \ldots, w_v$ values that are located after the code redundant bits in the composed string message, and $c^{j3}$, being created as v bis length sequence, while each watermark is 1 bit in length and the pseudo-random sequence $c^{j4}$ being generated from the seed $X_j^4$ determining the pseudo-random permutation $\pi$ of the composed string that includes the string $(b_j\|keyword)$ encapsulated by $c^{j1}$, redundant bits $r_1, \ldots, r_q$ encapsulated by $c^{j3}$, and the unprotected watermarks.

In another aspect of the invention that has equal applicability to the method, apparatus and product, the sender sends only O(log n) new random numbers out of the n numbers of the vector in each communication session, wherein the sender chooses randomly O(log n) distinct indices in the range 1 to n and sends the chosen indices together with a vector of O(log n) randomly chosen numbers, and wherein the chosen indices are used to update the vectors B of the sender and the receiver, reducing the number sent and the number of updates in each session from n to O(log n).

Another object of the invention is to provide an apparatus for maintaining secure communication between and RFID sender and an RFID receiver comprising:

means for initializing to provide both the reader and the sender with (i) an initial vector array B=a[1 ... n], (ii) i=1 and (iii) a keyentry=n−(i−1)mod n; one of means for sending a request by the receiver to the sender for a response and means for the sender being enabled to transmit to the receiver by being in proximity with the receiver and thereby receiving power;

means for creating by sender, responsive to one of receiving request or being powered, a message composed of a new random array b and a key X=a[keyentry];

means for calculating a key message to be sent by sender to the receiver, the key message composed as s=(X,b) and sending key message to receiver;

means for receiving key message by receiver and for calculating if X=a[keyentry], and if so, sending positive message to sender, and if not so, sending negative message to sender; and means for sender to initiate an action responsive to receiving a positive signal.

The apparatus can include means for updating sender and receiver with said new random array b and/or means for sender to create a pseudo-random sequence prs of length m. The apparatus can include means for sender to initializing the integer seed to zero calculate a pseudo-random sequence prs from the updated seed seed=X[keyentry] $\oplus$ seed, and calculate Y=(b||keyword) $\oplus$ prs, and to send to receiver, and means for receiver to calculate Z=Y$\oplus$ prs; and to determine if Z[(n+1) ... m]$\in$keywords, and if so, to send positive message to sender, and if not so, to send negative message to sender.

The apparatus can further include means for dividing the seed X into four independent seeds $X_j^1, X_j^2, X_j^3$ and $X_j^4$, with each seed $X_j^k$, k=1, ... 4, for generating a corresponding pseudo-random sequence $c^{jk}$. The apparatus can include for adding watermarks to message sent to receiver.

The apparatus can include means for sending the message to receiver with the following structure $$Y_j = \pi((b_j || \text{keyword}) \oplus (c_1^{j1}, \ldots, c_m^{j1}) || (r_1, \ldots r_q) \oplus (c_1^{j2}, \ldots, c_q^{j2}) || (w_1, \ldots, w_v)).$$

wherein $\pi$ determines the pseudo-random permutation of the concatenated string $((b_j || \text{keyword}) \oplus (c_1^{jk}, \ldots c_m^{j1}) || (r_1, \ldots r_q) \oplus (c_1^{j2}, \ldots c_q^{j2}) || (w_1, \ldots, w_v))$, the random string $b_j$ concatenated with the keyword string extended by error detection redundancy bits $r_1, \ldots, r_q$ to form a legal codeword, and the pseudo-random sequence $c^{j2}$ being generated from the seed $X_j^2$ encapsulating the redundant bits $r_1, \ldots, r_{q_1}$, with the pseudo-random sequence $c^{j4}$ being generated from the seed $X_j^3$ determining the watermarks $w_1, \ldots, w_v$ values that are located after the code redundant bits in the composed string message, and $c^{j3}$ being created as v bits length sequence, while each watermark is 1 bit in length and the pseudo-random sequence $c^{j4}$ being generated from the seed $X_j^4$ determining the pseudo-random permutation $\pi$ of the composed string that includes the string (b_j||keyword) encapsulated by $c^{j1}$, redundant bits $r_1, \ldots, r_q$ encapsulated by $c^{j3}$, and the unprotected watermarks.

It is still a further object of the invention to provide a computer readable medium for an RFID sender containing executable instructions for initializing the sender with (i) an initial array B=a[1 ... n], (ii) i=1 and (iii) a keyentry=n−(i−1)mod n; for creating by sender, responsive to receiving request from a reader, a new random array b, and a key X=a[keyentry]; for calculating a key message by sender as s=(X,b) and for sending key message to a receiver; and for updating the sender with said new random array b.

Further the computer readable medium can include k-bit length codes of instructions keywords for the sender. The computer readable medium can include executable instructions for initializing the integer seed to zero and creating a pseudo-random sequence prs of length m. Also, the computer readable medium can include executable instructions for calculating from the updated seed seed=X[keyentry] $\oplus$ seed, Y=((b||keyword) $\oplus$ prs), and sending to receiver. Still further, the computer readable medium can include executable instructions for dividing the seed X into four independent seeds $X_j^1, X_j^2, X_j^3$ and $X_j^4$, with each seed $X_j^k$, k=1, ... 4, generating a corresponding pseudo-random sequence $c^{jk}$. Also, the computer readable medium can include executable instructions for adding watermarks to message sent to receiver.

The computer readable medium can include executable instructions for sending the message to receiver with the following structure $$Y_j = \pi((b_j || \text{keyword}) \oplus (c_1^{j1}, \ldots, c_m^{j1}) || (r_1, \ldots r_q) \oplus (c_1^{j2}, \ldots, c_q^{j2}) || (w_1, \ldots, w_v)).$$

wherein $\pi$ determines the pseudo-random permutation of the concatenated wherein $\pi$ determines the pseudo-random permutation of the concatenated string $(b_j || \text{keyword}) \oplus (c_1^{j1}, \ldots, c_m^{j1}) || (r_1, \ldots r_q) \oplus (c_1^{j2}, \ldots, c_q^{j2}) || (w_1, \ldots, w_v))$, the random string $b_j$ concatenated with the keyword string extended by error detection redundancy bits $r_1, \ldots, r_q$ to form a legal codeword, and the pseudo-random sequence $c^{j2}$ being generated from the seed $X_j^2$ encapsulating the redundant bits $r_1, \ldots, r_{q_1}$, with the pseudo-random sequence $c^{j3}$ being generated from the seed $X_j^3$ determining the watermarks $w_1, \ldots, w_v$ values that are located after the code redundant bits in the composed string message, and $c^{j3}$ being created as v bits length sequence, while each watermark is 1 bit in length and the pseudo-random sequence $c^{j4}$ being generated from the seed $X_j^4$ determining the pseudo-random permutation $\pi$ of the composed string that includes the string (b_j||keyword) encapsulated by $c^{j1}$, redundant bits $r_1, \ldots, r_q$ encapsulated by $c^{j3}$, and the unprotected watermarks.

It is also an object of the present invention to provide a computer readable medium for an RFID receiver containing executable instructions for initializing the receiver with (i) an initial array B=a[1 ... n], (ii) i=1 and (iii) a keyentry=n−(i−1)mod n; for creating by receiver, responsive to receiving from a sender, a key message s=(X,b), wherein b is a new random array b, and X=a[keyentry]; for determining if key message sent by sender contains X=a[keyentry], and if so, sending positive message to sender, and if not so, sending negative message to sender, and for updating receiver with said new random array b.

The computer readable medium can include k-bit length codes of instructions keywords for the receiver. Further, the computer readable medium can include executable instructions for creating a pseudo-random sequence prs of length m and initializing the integer seed to zero. Still further, the computer readable medium can include executable instructions for calculating from updated seed seed=X[keyentry] $\oplus$ seed, Y$\in$(b||keyword) $\oplus$ prs, and for determining Z[(n+1) ... m]$\in$keywords, and if so, to send positive message to sender, and if not so, to send negative message to sender.

The computer readable medium can include executable instructions for determining watermarks in a message sent to receiver. The computer readable medium can include executable instructions for receiving a message with the following structure $$Y_j = \pi((b_j \| \text{keyword}) \oplus (c_1^{j_1}, \ldots, c_m^{j_1}) \| (r_1, \ldots r_q) \oplus (c_1^{j_2}, \ldots, c_q^{j_2}) \| (w_1, \ldots, w_v)).$$

wherein $\pi$ determines the pseudo-random permutation of the concatenated string $((b_j \| \text{keyword}) \oplus (c_1^{j_1}, \ldots, c_m^{j_1}) \| (r_1, \ldots r_q) \oplus (c_1^{j_2}, \ldots, c_q^{j_2}) \| (w_1, \ldots, w_v))$, the random string $b_j$ concatenated with the keyword string extended by error detection redundancy bits $r_1, \ldots, r_q$ to form a legal codeword, and the pseudo-random sequence $c^{j_2}$ being generated from a seed $X_j^2$ encapsulating redundant bits $r_1, \ldots, r_{q_1}$, with the pseudo-random sequence $c^{j_3}$ being generated from a seed $X_j^3$ determining watermarks $w_1, \ldots, w_v$ values that are located after the code redundant bits in the composed string message, and $c^{j_3}$ being created as v bits length sequence, while each watermark is 1 bit in length and the pseudo-random sequence $c^{j_4}$ being generated from a seed $X_j^4$ determining the pseudo-random permutation $\pi$ of the composed string that includes the string $(b_j \| \text{keyword})$ encapsulated by $c^{j_1}$, redundant bits $r_1, \ldots, r_q$ encapsulated by $c^{j_3}$, and the unprotected watermarks.

Other and further objects and advantages of the present invention will become more apparent from the following detailed description of preferred embodiments when taken in conjunction with the appended drawings.

BRIEF DESCRIPTION OF THE DRAWINGS

FIGS. 1A and 1B show, respectively, operation of matrix proactive information secure protocol and operation of vector proactive information secure protocol as employed in the method, apparatus and product of the present invention.

FIG. 2 shows in table form the steps of the proactive information secure protocol of the method of the present invention.

FIG. 3 shows in table form the steps of the proactive computational secure protocol of the method of the present invention.

DETAILED DESCRIPTION OF PREFERRED EMBODIMENTS OF THE INVENTION

The method and apparatus of the present invention will be described hereafter with reference to specific preferred embodiments. Initially described is the specific embodiment employing the basic information secure protocol $AP_1$. The cases or instances in which the adversary does not listen in k>1 sessions of any n successive sessions will be described next. Then the next specific embodiment of the invention employing combined computational secure protocol $AP_2$ will be described, followed by the specific embodiment employing the improved $\tilde{AP}_2$ protocol resistant against intruder-in-the-middle attack.

Figure 4:
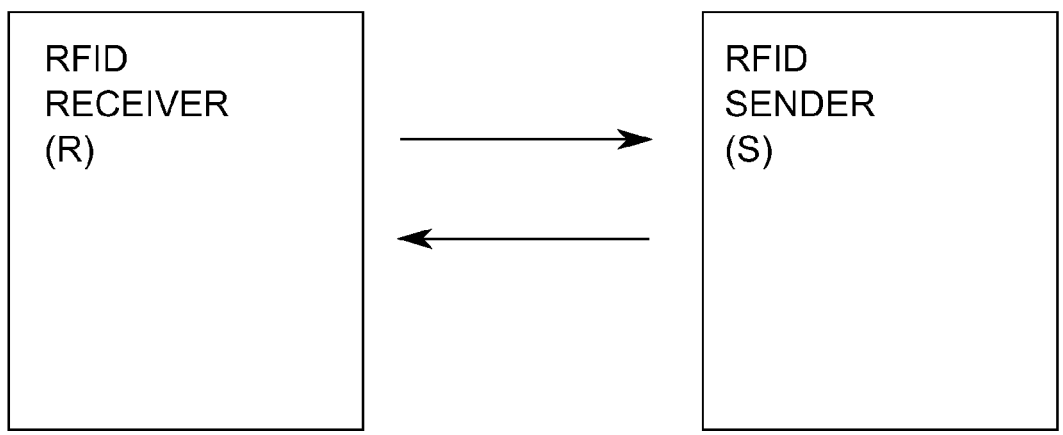
FIG. 4 shows in block diagram the general arrangement of an RFID receiver and an RFID sender.

The invention provides a method and apparatus for providing security for RFID Tags, and a secure communication between an RFID sender and RFID receiver. The apparatus is generally shown in FIG. 4 in block diagram. The (RFID) sender and the (RFID) receiver are denoted by S and R, respectively, see FIG. 4. The sender and the receiver communicate by sending and receiving messages, indicated by the arrow-headed lines in FIG. 4, according to the method of the present invention as embodied in predefined programs that form together a communication protocol.

Figure 5:
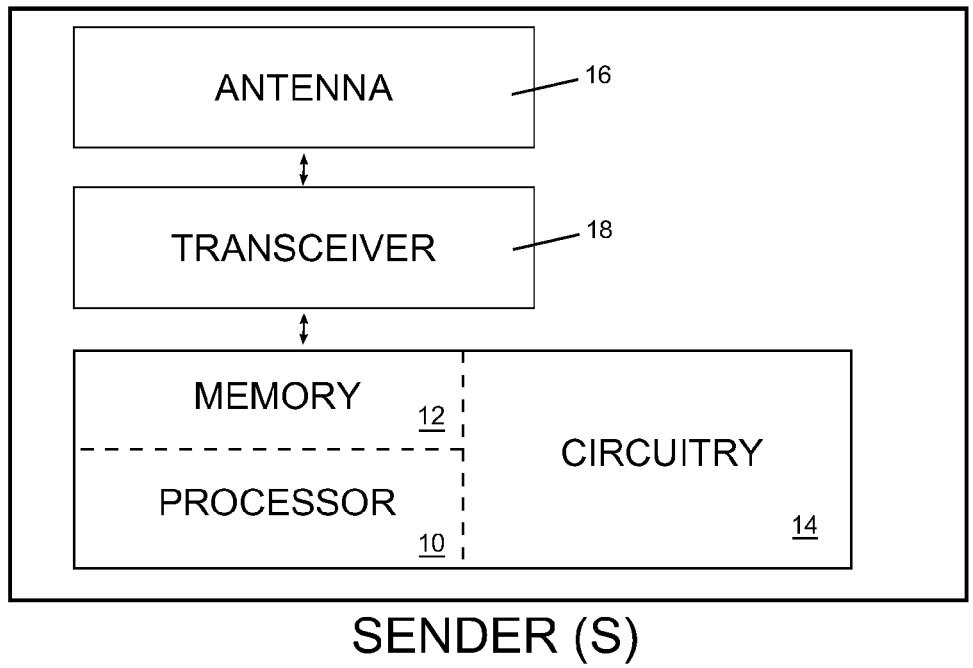
FIG. 5 shows in block diagram the general arrangement of the organization of an RFID sender.

FIG. 5 shows in block diagram the organization of an RFID sender (S). As shown the sender consists of an appropriate IC chip containing a processor 10, a memory 12 and circuitry 14 in a standard known configuration, and an antenna 16 and a transceiver 18 coupled to the antenna and the processor to receive and send signals, all mounted on substrates and integrated or encapsulated into a monolithic structure or device, as is known in the art. The sender (S) has a very limited or no power source and may receive its power from the receiver (R), as is well known. The IC chip is programmed by software to carry out the method of the present invention regarding protocols $AP_1$, $AP_2$ or $\tilde{AP}_2$.

Figure 6:
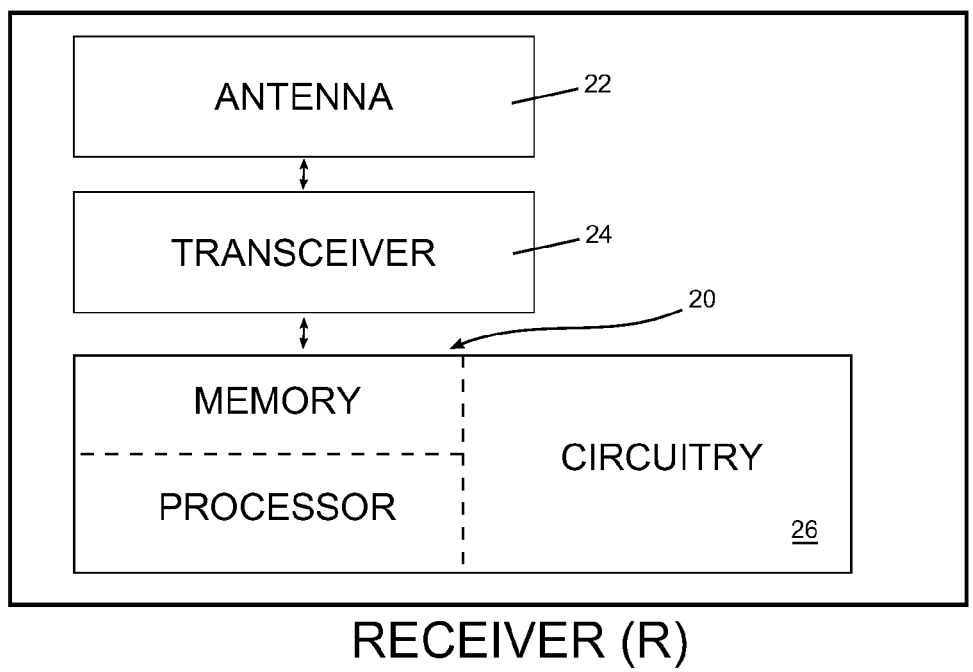
FIG. 6 shows in block diagram the general arrangement of the organization of an RFID receiver.

FIG. 6 shows the organization of an RFID receiver (R). As shown the receiver consists of a computer 20 including memory, processor and I/O, an antenna 22 and a transceiver 24 coupled to the antenna and the computer for sending and receiving signals. Other circuitry 26 is included to amplify, shape, modulate and demodulate signals and for other purposes, as is well known in the art. The computer is programmed by software to carry out the method of the present invention regarding protocols $AP_1$, $AP_2$ or $\tilde{AP}_2$.

In the method of the present invention as illustrated in the FIG. 2, the $i^{th}$ message sent by the sender and by the receiver is denoted as $s_i$ and $r_i$, respectively. The sequence of alternating messages $M=(s_1, r_1); (s_2, r_2); \ldots$ sent during the course of the protocol execution can be divided into non-overlapping subsequences, so that each subsequence $S_i=(s_{i_k}, r_{i_k})$ is called a communication session. The union of the communication sessions forms the entire sequence of messages M. Each $S_i$ starts with a message sent by the sender and ends when the receiver decides to send a message $r_{i_k}$=Open or $r_{i_k}$=DoNotOpen. Any message $s_k$ sent by the RFID sender is defined as a key message. Actually, the message $r_{i_k}$ represents a change in state of the receiver which corresponds to the sender password authentication as the one that can enter to use a resource.

If one assumes a Byzantine adversary denoted as A that listens in the part or all of the sequence M and may try to send complete messages on behalf of the sender. The goal of the adversary is either to make the receiver sending message r=Open or to drive the receiver into a deadlock state after which the receiver will not be able to send the message r=Open to the sender.

The first basic authentication protocol $AP_1$ employed in the method, apparatus and product of the present invention is the proactive informational secure protocol. The information security feature of this protocol is provided by the assumption that within any n consecutive communication sessions $S_{i_1}=(s_{i_1}, r_{i_1}) \ldots S_{i_n}=(s_{i_n}, r_{i_n})$ there is at least one message $s_{i_k}$ sent by the RFID sender S which the adversary is not aware of. The strict limitation imposed on the adversary is lessened in the combined computational secure protocol $AP_2$. The security power of $AP_1$ and $AP_2$ protocols is based on random numbers generation and their updating at each communication session.

Two similar versions of expressing the proactive information secure protocol $AP_1$ is shown in FIGS. 1A, 1B and 2. Denote the space of the matrix's B elements by $\{a_{ij}, b_{ij}\}$, see FIG. 1A. Here the sub-set $\{a_{ij}\}$ denote the elements of B's granted to S and R, respectively, during the initialization procedure while the sub-set $\{b_{ij}\}$ consist of random numbers that update B matrix during the communication sessions. At the initialization stage S and R both get a unique square matrix $B=(a_{ij})$ so that dim (B)=n (FIG. 1A). In order to perform the authentication procedure, S starts the communication session and passes to R the key message $s_1=(X_1, b_1)$. $s_1$ consists of the following pair: XOR of the nth column elements $X_1=a_{1n}, \oplus a_{2n} \oplus \ldots \oplus a_{nn}$ and randomly generated n-dimensional vector $b_1=(b_{11}, b_{12}, \ldots, b_{1n})$.

After transmission of the first key message $s_1$, S and R, respectively, shift B's rows below so that $b_1=(b_{11}, b_{12}, \ldots, b_{1n})$ is treated as the first B's row and the last row is deleted.

During the next authentication session S and R repeat the same procedure: S generates the new random n-dimensional vector $b_2=(b_{21}, b_{22}, \ldots b_{2n})$, calculates XOR of (n−1) B's column elements $X_2=b_{1n-1} \oplus a_{1n-1} \oplus \ldots \oplus_{n-1n-1}$, and sends the newly generated key message $s_2=(X_2, b_2)$ to R. R generates the response message $r_2$ in the previously described manner.

The authentication procedure is repeated continually scanning the matrix columns (one after the other) and changing the appropriate row. After each $i^{th}$ authentication success both S and R, respectively, shift the B's rows below so that the last matrix B row is deleted and the vector $b_i$ occupies the first B's row. Note that $b_i$ has been previously randomly generated by S and has been sent to B in the message $s_{j-1}$.

In order to confirm the correct authentication, the RFID receiver R executes the authentication procedure in the following manner: upon receiving the key message $s_i=(X_i, b_i)$, R verifies that $X_i$ is the correct XOR of the appropriate entries of the $(n-(i-1)(\mod(n)))^{th}$ column. If so, then R confirms the correct authentication, "transmits" to S the message $r_i$=Open and updates the matrix B. Otherwise, R "transmits" to S the message $r_i$=DoNotOpen and does not update the matrix B.

Assume that during the course of executing $AP_1$ it holds that in any sequence of alternating messages $M=(s_1, r_1), (s_2, r_2) \ldots$ the following condition is satisfied: in any n-length sequence M of alternating messages between S and R there is at least a single message $s_{j_k}$ not captured by the adversary. Assume that in order to break the security system of the RFID receiver, the adversary performs authentication procedure on behalf of the RFID sender. To do so in any $S_j^{th}$ communication session the adversary has to forge the key message $s_j$, namely, to correctly guess the XOR of the corresponding $(n-(j-1)(\mod(n)))^{th}$ column elements of the basic matrix B.

Assume that dim (B)=n. Assume that the single unknown to the adversary key is $n^{th}$ B's column $(a_{1n}, a_{2n}, \ldots, a_{nn})$ and the appropriate row vector is $b_1=(b_{11} \ b_{12} \ldots b_{1n})$ that have been sent by S in the message $s_1=(X_1, b_1)$ during the first communication session (FIG. 1A, Step 1).

After transmitting the first key message $s_1=(X_1, b_1)$, $X_1=(a_{1n} \oplus a_{2n} \ldots \oplus a_{nn})$, $b_1=(b_{11}, b_{12}, \ldots, b_{1n})$ to the RFID receiver both S and R shift the rows of B's according to the described above procedure.

Note that in the next trial S will send to R the XOR of the updated $(n-1)^{th}$ B's column $X_2=(b_{1n-1} \oplus a_{1n-1} \oplus \ldots \oplus a_{n-1n-1})$ and a new randomly generated vector $b_2=(b_{2n}, b_{2n-1}, \ldots, b_{21})$ (FIG. 1A, Step 2).

Now matrix B differs from the previous one by the newly inserted first row and the appropriate deletion of the last row. The matrix B updating is done by S and R in each successful communication session. Accordingly, the method of the present invention is secure. The $AP_1$ authentication protocol is information theoretic secure. It means that the probability that the adversary will forge the key message and perform successfully the communication session on behalf of the RFID sender S, is negligible for long enough l, where l is the number of bits of the entry in the matrix B.

The vector version of the $AP_1$ protocol is more memory efficient embodiment of the invention. Therefore it fits better the limited memory passive RFID tags, and it provides smaller memory usage. The vector version of the proactive information secure protocol $AP_1$ is described in FIG. 2 in conjunction with FIG. 1B. Vector's B entries are denoted by $\{a_{1i}, b_{ij}\}$. Here the sub-set $\{a_i\}$ denote the entries of B's granted to S and R, respectively, during the initialization procedure while the sub-set $\{b_{ij}\}$ consists of random numbers that update B vector during the i-th communication sessions.

At the initialization stage, Step 1 of FIG. 1B, S and R both get a unique vector $B=(a_{1j})$ so that dim (B)=n (FIG. 2, Protocols for RFID Sender and Receiver, lines 1-2). In order to perform the authentication procedure, S starts the communication session and passes to R the key message $s_1=(X_1; b_1)$ (lines 6-9 in FIG. 2, Protocol for RFID Sender). $s_1$ consists of the following pair: vector's B $n^{th}$ entry $X_1=a_{1n}$ and randomly generated n-dimensional vector $b_1=(b_{11}, b_{12}, \ldots, b_{1n})$, see FIG. 1B step 1.

After transmission of the first key message $s_1$, S and R, respectively, initialize $a_{1n}$ to zero and update B vector by calculating XOR of each entry with the corresponding entry of $b_1$.

During the next authentication session S and R repeat the same procedure: S generates the new random n-dimensional vector $b_2=(b_{21}, b_{22}, \ldots, b_{2n})$, and sends the newly generated key message $s_2=(X_2, b_2)$ to R. Here $X_2=a_{1n-1}$, where $a_{1n-1}= a_{1n-1} \oplus b_{1n-1}$. R generates the response message $r_{i+1}$ in the previously described manner.

The authentication procedure is repeated continually scanning the vector B entries (one after the other) and updating B's entries by initializing the lastly sent value to 0 and calculating XOR of its entries with the corresponding entries of the newly randomly generated vector. After each $i^{th}$ authentication success both S and R, respectively, initialize the B's entry used in i-th authentication session, to 0. Vector B is updated by calculating XOR of each entry with the corresponding entry of the vector $b_i$. Note that $b_i$ has been previously randomly generated by S and has been sent to B in the message $s_{j-1}$. Updating procedure and calculation of XOR for the corresponding B's entry are described in FIG. 2 (lines u1-u5, Protocol for RFID Sender).

In order to confirm the correct authentication, the RFID receiver R executes the authentication procedure in the following manner: upon receiving the key message $s_i=(X_i, b_i)$ R verifies that $X_i$ is the correct XOR of the appropriate $(n-(i-1)(\mod(n)))^{th}$ entry. If so, then R confirms the correct authentication, "transmits" to S the message $r_i$=Open and updates the vector B (lines 4-8 in FIG. 2, Protocol for RFID Receiver). Otherwise, R "transmits" to S the message $r_i$=DoNotOpen and does not update the vector B.

Assume that during the course of executing $AP_1$ it holds that in any sequence of alternating messages $M=(s_1, r_1), (s_2, r_2), \ldots$ the following condition is satisfied: in any n-length sequence M of alternating messages between S and R there is at least a single message $s_{jk}$ not captured by the adversary. Assume that in order to break the security system of the RFID receiver, the adversary performs authentication procedure on behalf of the RFID sender. To do so in any $s_j^{th}$ communication session the adversary has to forge the key message $s_{ji}$, namely, to correctly guess the value of the corresponding $(n-(j_i-1) \pmod{n}))^{th}$ entry of the basic vector B.

Assume that vector B is n-dimensional vector. Assume that the single unknown to the adversary key is $n^{th}$ B's entry ($a_{1n}$) and the appropriate row vector is $b_1=(b_{11}, b_{12}, \ldots, b_{1n})$ that have been sent by S in the message $s_1=(X_1, b_1)$ during the first communication session (FIG. 1, Step 1).

After transmitting the first key message $S_1=(X_1, b_i)$, $X_1=(a_{1n})$ to the RFID Receiver both S and R update the vector B's according to the described above procedure.

Note that in the next trial S will send to R the updated $(n-1)^{th}$ B's entry: $X_2=(b_{1n}-1 \oplus a_{1n}-1)$ and a new randomly generated vector: $b_2=(b_{21}, b_{22}, \ldots, b_{2n})$ (FIG. 1B, Step 2).

Now vector B is equal to the previous one $a_1$ with the initialized entry $a_{1n}-1=0$ XOR-ed with the vector $b_2=(b_{21}, b_{22}, \ldots, b_{2n})$. The vector B updating is done by S and R in each successful communication session. The method of the invention according to the $AP_1$ authentication protocol is information-theoretic secure. It means that the probability that the adversary will forge the key message and perform successfully the communication session on behalf of the RFID sender S, is negligible for long enough l, where l is the number of bits of the entry in the vector B.

The following Theorem proves that the protocol $AP_1$ employed by the method of the invention is information theoretic secure.

Theorem 1: $AP_1$ protocol is theoretical information secure and proactive.

Proof: The $AP_1$ information security feature is based on the fact that, at any authentication step i, the following conditions hold: (i). the RFID sender S and the RFID receiver R maintain the same vector B; (ii). S and R are synchronized in the sense that both S and R perform the authentication procedure using as a key the same $n-(j-1) \pmod{n}$ entry; (iii). the vector B shared by S and R is a function of at least one XOR-ed operation with a random number unknown to the adversary. The proof is implemented by induction of session number i. Basis of Induction i=1:

As it has been mentioned above, the first key message $s_1=(X_1, b_1)$ at the first communication session $S_1$ contains $a_{1n}$ that is unknown to the adversary. Evidently, S and R maintain the same vector B that has been defined at the initialization stage when the adversary was not present. S and R are synchronized because the first key message that S sends to R and R expects to receive is $a_{1n}$ which is the $n^{th}$ entry of the vector B.

Induction step: a. Assume that during every i<n communication session S and R maintain the same vector B. Then the vector B shared by S and R during the next i; i≧n communication session will differ from the previous one by appropriate initializing of the used $n-(i-1)(\bmod(n))$-th entry of B and respective XOR-ing of each B-th entry with the corresponding entry of the vector $b_i$ that has been sent to R in the previous communication session.

b. Finally, assume that during any i<n communication session, S and R agree on the same B's entry $n-(i-1)(\bmod(n))$ that is the basis for constructing the key message. Then, at the next i>n communication session the entry number is reduced by 1 mod(n). As a result, the basis for constructing the key message at the sender and the receiver' sides, respectively, is the same B's $n-(i-2)(\bmod(n))$ entry.

c. For i<n all the entries of the B vector in each communication session $S_j$ among i communication sessions $S_1, \ldots, S_i$ are unknown to the adversary. The induction assumption is correct due to the initialization procedure performed by S and R, respectively. In addition, for any i≧n the basic condition that for each $i^{th}$ communication session B's entries are unknown to the adversary also holds. It is based on the assumption that among any n successive communication sessions there is at least a single session that the adversary was not eavesdropping.

The $AP_1$ proactive feature is proved in the following way. Assume that the adversary has gotten access to the whole vector B. Assume that in the $j^{th}$ communication session $S_j$ that follows this security failure, the adversary was not listening in to the message $s_j$ sent by the RFID sender. In essence, during any of the following $(j+i)^{th}$ session, i≧1 each B's entry is XOR-ed with corresponding entry of the bc. Note that the adversary was not listening in bc. Therefore, the basic condition, that within n consecutive messages sent from S to R there is at least a single message unknown to the adversary, is restored. As a result, the $AP_1$ information security feature is regained.

Assume that the adversary tends to drive the RFID receiver to a deadlock state after which the sender will not be able to cause the receiver to send a message r=Open. In order to do so the adversary must corrupt the vector B, say, by inserting a new entry in B's entry on behalf of the RFID sender. Nevertheless, the adversary will fail in this attempt because in order to insert a new entry in the vector B the adversary has to authenticate himself or herself on behalf of the RFID sender. The message $s_j$ that the adversary has to send to the receiver must include the correct $b_j$ value.

As a matter of fact, $AP_1$ has two parameters. The first parameter is vector B's size n. The larger n is, the weaker is the assumption about the adversary. The price paid for large n is the additional memory usage in the restricted memory size of the RFID devices. The second secure parameter is the number of bits l of an entry in B. The longer are B's entries, the smaller is the possibility for the adversary to guess the correct key.

Note that when the assumption is violated concerning one secure session in each sequential series of sessions, in which the adversary does not listen in, then the adversary can drive the system into a deadlock by, say, replacing B's entries, unknown to the sender.

With respect to the generalized 1 out of n private communication session assumption, consider the cases in which k≧1 out of n successive sessions are private, namely, the adversary is not listening in k out of any n successive sessions. In such cases, the number of random numbers sent in each communication session may be reduced. First, can be proved a lower bound on the total number of random numbers that are needed to be sent during n successive sessions.

For the lower bound, consider schemes for which the vector-entries that are chosen to be refreshed by random numbers are specified by a deterministic function. A vector entry is refreshed by XOR-ing a new random number to the current vector entry or assigning the entry by a random number. At least n·(k+1) new random numbers should be used during any n successive communication sessions.

Consider any n successive communication sessions. There are k sessions in which the adversary does not listen in. Since it is assumed that the adversary knows the scheme, the scheme must introduce at least k+1 refreshes for each vector-entry between any two successive usages of a vector-entry, thus the total number of refreshes in n successive sessions is at least n·(k+1) which imply at least one session of k+1 or more refreshes.

The above lower bound is based on deterministic choices of refresh sequence known to the adversary. In fact it is possible to use a randomized scheme, in which the vector-entries, that are chosen to be refreshed by random numbers, are randomly chosen. Assume that the adversary does not know the identity of the randomly chosen vector-entries that are refreshed during the communication sessions the adversary is not listening in. It can be shown that it is possible to send only (2n/k)(log n) random numbers in each session. Thus, for a given (say, bounded by a constant) fraction of private communication pcf=n/k, the number of random numbers reduces from n·(n/pcf+1) to 2n·pcf·log n. Note that when pcf is a constant, these numbers are $O(n^2)$ and $O(n \log n)$, respectively.

The randomized scheme chooses in each communication session 2 log n vector-entries and sends 2 log n random numbers to be XOR-ed with the corresponding vector-entries, sending the indices of the chosen vector-entries as well. It can be shown that each entry is refreshed with high probability during the k private communication sessions that immediately precede it.

It will now be shown that the probability that at least one refresh for each vector-entry takes place, is close to 1. The probability that a certain entry is not refreshed is less than $(1-1/n)^{2n \log n}$ (the inequality is due to the fact that during one communication session no vector-entry is refreshed twice). Given that $(1-1/n)^{2n \log n} \leq e^{-2 \log n} = 1/n^2$, it holds that the probability that all vector entries are refreshed is greater than $$1 - \sum_{i=1}^{n} 1/n^2 = 1 - 1/n.$$

Figure 7:
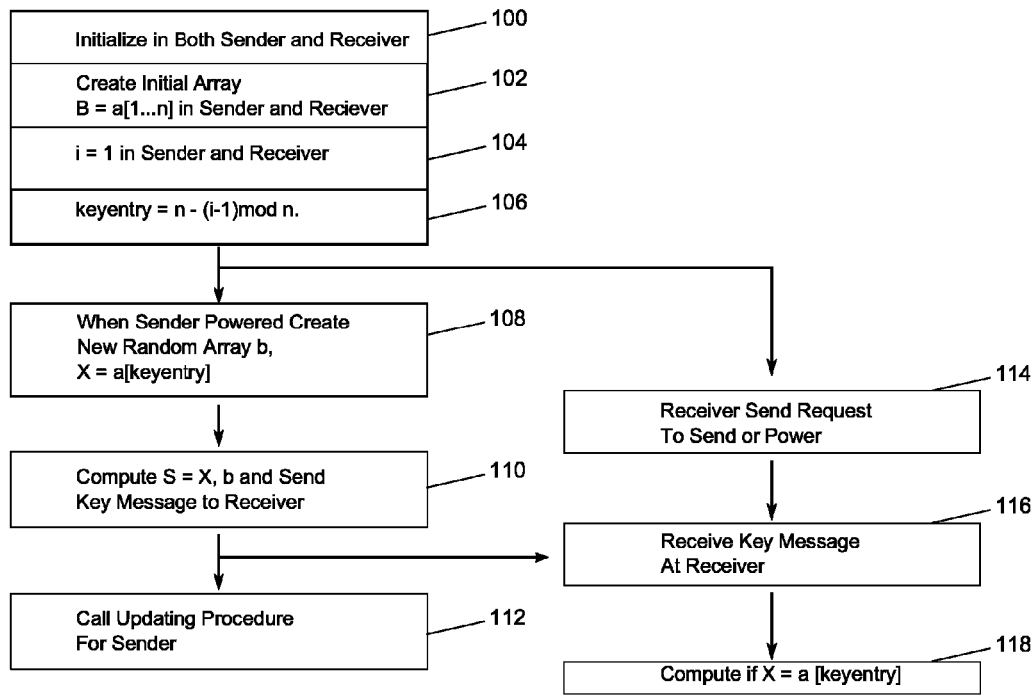
FIG. 7 shows in flow chart form the proactive informational secure protocol of $AP_1$.

The information secure protocol $AP_1$ is shown in flow chart form in FIG. 7. In step 100, both the Sender S and the Receiver R are initialized. In step 102 an initial array B=a [1 . . . n] is created in both the Sender S and the Receiver R. In step 104 both the Sender S and the Receiver R are initialized for i=1. In step 106 the Sender S and the Receiver R are provided with keyentry=n−(i−1)mod n. Sender creates new random array b, X=a[keyentry], and in step 110 creates s=(X, b) and sends key message to Receiver R, and in step 112 calls for updating procedure for Sender S.

Figure 8:
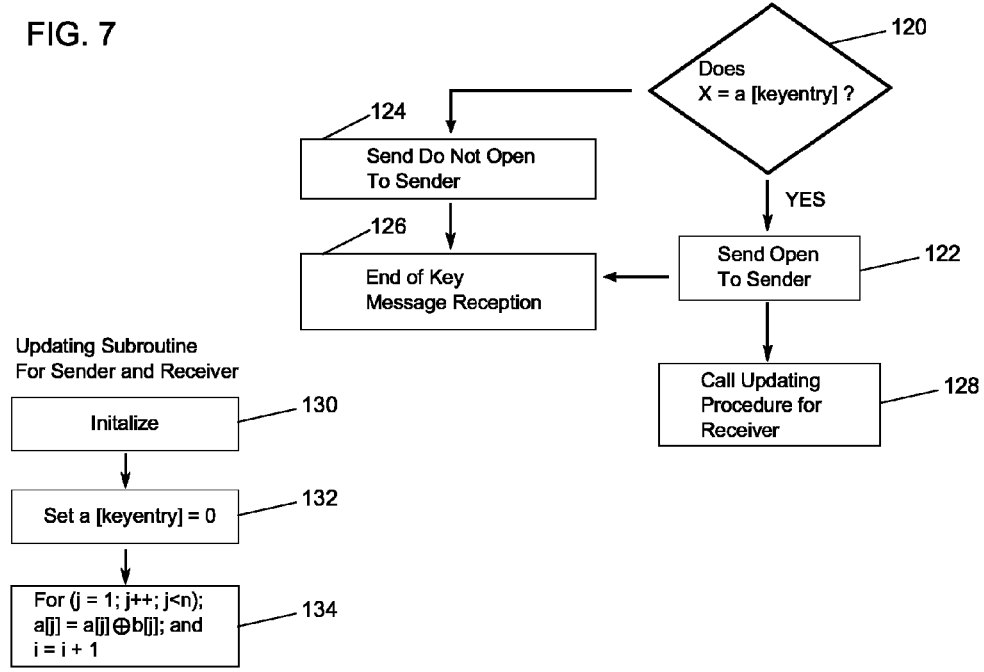
FIG. 8 shows in flow chart form the updating subroutine of the proactive informational secure protocol $AP_1$ for both S and R.

In step 116 Receiver R receives keymessage from Sender S, and in step 118 computes if X=a[keyentry]. If X=a[keyentry] as determined in step 120, then in step 122 the Receiver R, sends Open to Sender S. If the determination in step 120 is NO, the in step 124 the Receiver R sends DoNotOpen to the Sender S. In step 126 the transmission of the keymessage is terminated. Responsive to sending Open to Sender S, in step 128 updating procedure is called. The updating subroutine, when called, is shown in FIG. 8 and is the same for both the Sender S and the Receiver R. In step 130 both the Sender S and Receiver R are initialized for updating. In step 132 set a[keyentry]=0. In step 134 set for (j=1; j++; j<n); a[j]=a[j]⊕b [j]; and i=i+1.

There follows an alternative description of the first embodiment of the method and apparatus of the present invention employing the basic and combined authentication protocols. The first basic authentication protocol $AP_1$ is the proactive information secure protocol. As noted above, the information security feature of this protocol is provided by the assumption that within any n consecutive communication sessions $S_{i_1} = (s_{i_1}, r_{i_1}) \ldots S_{i_n} = (s_{i_n}, r_{i_n})$, there is at least one message $s_{i_k}$ sent by the RFID sender S which the adversary is not aware of. The strict limitation imposed on the adversary is lessened in the combined computational secure protocol $AP_2$ as will be described hereinafter. The security power of $AP_1$ and $AP_2$ protocols is based on random numbers generation and their updating at each communication session.

The method, apparatus and product of the present invention will be described with reference to combined computational secure protocol $AP_2$. Referring now to FIG. 3 where $AP_2$ protocol is illustrated. Consider the adversary allowed to listen in any session between the RFID sender S and the RFID receiver R. The purpose of the invention is to enhance the basic proactive information secure protocol $AP_1$.

As in the $AP_1$ case, both S and R get in the initialization stage the initial n-dimensional vector B (FIG. 3, Initialization, Protocols for RFID Sender and Receiver). In addition a certain predefined set of keywords k-bit length denoted by keywords are granted to S and R, respectively.

During the first authentication session S executes the following encryption procedure: As in the case of the proactive information secure protocol $AP_1$, S sends $n^{th}$ B's entry $X_1 = (a_{1n})$. New vector row $b_1 = (b_{11}, \ldots, b_{1n})$ is also created as in the proactive information secure protocol case. $X_1$ is used as a seed for the generation of the pseudo-random sequence prs of length m=n·I+k, where k is the keyword length [13]. The generation mechanisms of pseudo-random numbers are known in the art, See [13], Chapter 12 for possible choices of a known generation mechanism of the pseudo-random numbers.

S creates a new vector row $Y_1$ that should be sent to R in the first authentication message. $Y_1$ is equal to XOR of the previously generated pseudo-random sequence prs with vector $b_1$ concatenated with the keyword: $Y_1 = (prs \otimes (b_1 \| keyword))$ (FIG. 3). Eventually, the secure information encapsulation is provided. The first key message sent from S to R during the first communication session is $s_1 = (Y_1)$ (FIG. 3, Protocol for RFID Sender, Upon user request).

Upon receiving the message $s_1 = (Y_1)$ R decrypts it by calculating $Y_1 \otimes prs$. If the decrypted suffix of the string is equal to the predefined string keyword, then the RFID receiver R authenticates the RFID sender S and returns the message $r_1$=Open to the RFID sender S. The vector B updating is provided by the prefix of the decrypted string as in the basic information secure Protocol $AP_1$ shown in FIG. 2. Otherwise, the message $r_1$=DoNotOpen is sent to S (FIG. 3, Upon key message reception, Protocol for RFID Receiver). Updating procedure is described in FIG. 3 (Updating procedure, Protocol for RFID Sender).

During any $j^{th}$ authentication session $S_j$, j=1, 2, . . . the message $s_j$ sent by S is as follows: $Y_j = (prs \otimes (b_j \| keyword))$, where prs is the pseudo-random sequence generated by the seed $X_j$ XOR-ed with the seed used in the previous communication session. $X_j$ is equal to $(n-(j-1)(mod(n)))^{th}$ B's entry, and $b_j$ is a newly generated random vector that updates the vector B. It should be noted that the set of keywords and the one way function that generates the pseudo-random numbers can be known to the adversary. The computational security of the designed protocol $AP_2$ is provided by means of the random seed generation in each session. Moreover, the recursive reuse of the seed used in the previous communication session enhances the security of $AP_2$ where the adversary does not listen in.

As a matter of fact, the seed $X_1$ used in the first communication session $S_1$ is unknown to the adversary. The reason is that the adversary has not been present at the initialization stage. Therefore, the initial B's entries are not available for the adversary. The seed updating is performed continuously in each communication session. Hence, the adversary does not get enough information to guess the secret seeds by observing and analyzing the transmitted messages.

In essence, the encryption scheme is based on the message encapsulation by means of the One Time Pads techniques ([15]), whereas the pads are created by pseudo-random sequence using a randomly created seed defined by the updating procedure of the vector B. The following theorem proves the correctness of $AP_2$.

Theorem 2: The $AP_2$ protocol is proactive computationally secure protocol.

Proof: Assume that the adversary is listening in all communication sessions $S_{i_1}, \ldots, S_{i_n}$ between S and R. Even though the one way function $f$ that generates the pseudo-random sequence prs is available to the adversary, calculating its invert $f^{-1}$ is computationally infeasible ([15]). Hence, correct prediction of the seed $X_{i_{n+1}}$ and the corresponding pseudo-random sequence prs for the next communication session $S_{i_{n+1}}$ that the adversary wishes to provide in order to break the security system, is computationally infeasible.

The RFID receiver R confirms the sender S authentication at each $j^{th}$ communication session by revealing the keyword string from the received decrypted message $s_j$. If the decrypted keyword string is correct, then R accepts S as a correct authentication.

The proactive feature of $AP_2$ is now proved as follows. Assume that the adversary has successfully broken the security system and has gotten access to the whole vector B. Hence, the adversary can correctly calculate the seeds that should be used in the following sessions. However, after the first session in which the adversary is not present, $AP_2$ satisfies the conditions of the information secure protocol $AP_1$. As a result, the information and computational security features are restored.

The $AP_2$'s parameters that define the pseudo-random sequence length are n, l is the number of bits of an entry in the vector B, and the keyword length k.

Figures 9, 10:
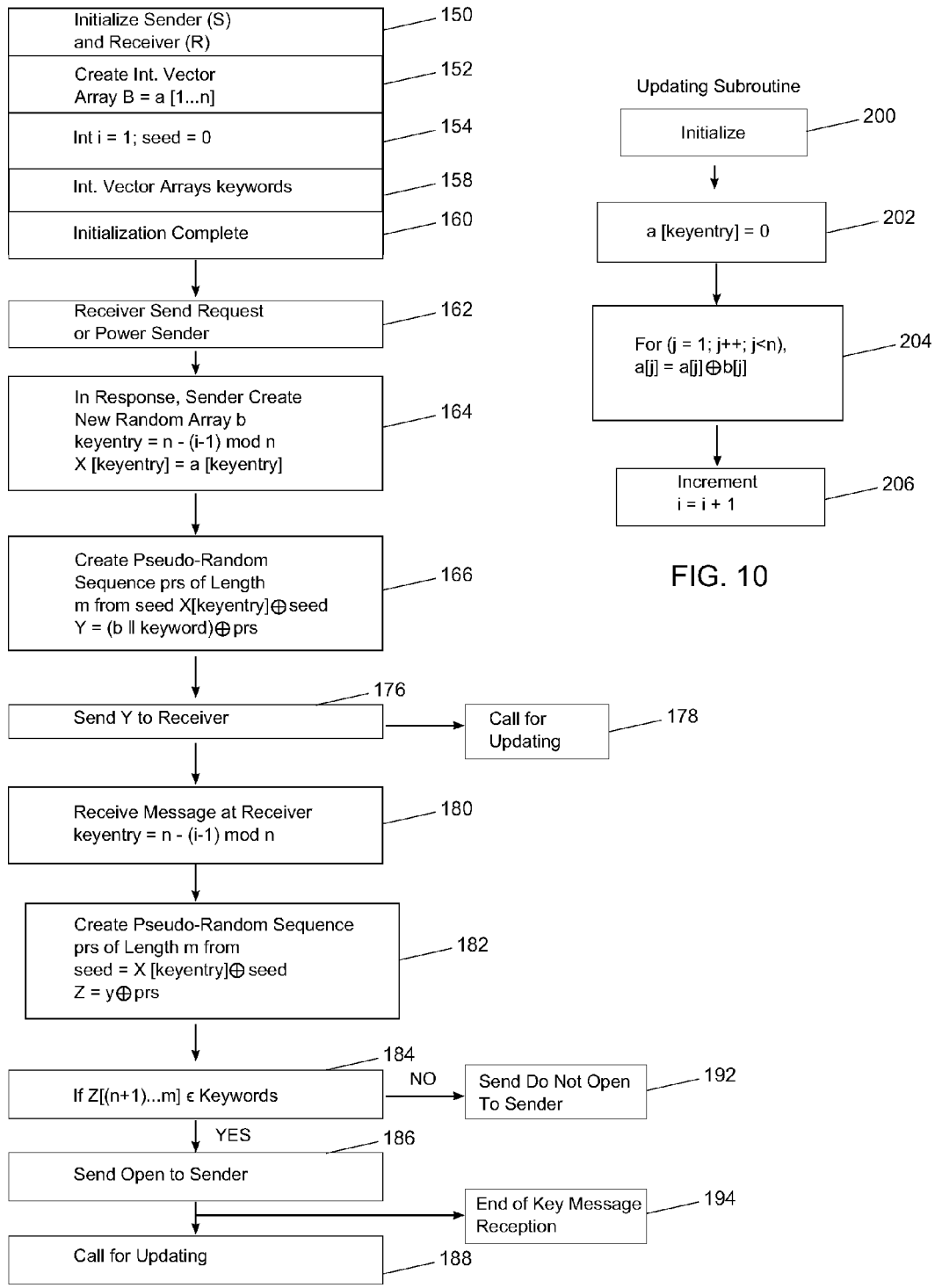
FIG. 9 shows in flow chart form the proactive computational secure protocol of $AP_2$.
FIG. 10 shows in flow chart form the updating routine of the proactive computational secure protocol $AP_2$.

The $AP_2$ protocol is shown in flow chart form in FIG. 9. Both Sender S and Receiver F are initialized in step 150 as follows. In step 152 create an initial array B=a[1 . . . n]; in step 154 initialize i=1; in step 156 keyentry=n−(i−1)mod n; in step 158 define keywords; and in step 160 initializing is complete. In step 164 Sender S creates new random array b, X[keyentry]=a [keyentry]. In step 166 Sender S creates pseudo-random sequence prs of length m from seed X[keyentry] $\oplus$ seed, and calculates Y=(b$_j$||keyword) XOR prs. In step 176 Sender S sends s=Y to Receiver R and in step 178 calls for updating. In step 180 the messages is received at the Receiver R. In step 182 Receiver R calculates Z=Y$\oplus$ prs, and then determines in step 184 if Z[(n+1) . . . m]∈keywords. If YES, then in step 186 the Receiver R sends Open to the Sender S and calls for the updating subroutine in step 188. If NO, then in step 192 the Receiver R sends DoNotOpen to the Sender S. In step 194 the Receiver R ends the message reception.

The updating subroutine is shown in flow chart form in FIG. 10 and is the same for both Sender S and Receiver R. When the updating is initialized in step 200, a[keyentry] is set to 0 in step 202; for (j=1; j++; j<n), a[j]=a[j]$\oplus$b[j] in step 204; and i is incremented to i+1 in step 206.

The computationally secure protocol $AP_2$ can be upgraded in order to be able to cope with the IIMA [15] (Resistance Against Intruder-in the Middle-Attack). This type of attack is possible when the intruder listens in on the encrypted message sent by the RFID sender S to the RFID receiver R and changes the bits of the message even without trying to provide the authentication procedure on behalf of the sender. If the assumption is relaxed about the atomicity of each communication session coping with adversarial success in performing IIMA that may immediately lead the RFID receiver R to change the basic vector B. As a result, R enters a deadlock state after which it will be unable to send the message Open. In order to strengthen the $AP_2$ protocol against the IIMA it is proposed to use digital watermarking [2] and redundant coding [16]. The extended computationally resistant against IIMA $\tilde{AP}_2$ protocol is defined in the following way. As in the $AP_2$ case the encryption key is derived from the basic vector B. The seed $X_j$ calculated from the corresponding vector-entry and from the seeds used in the previous sessions, is divided now into four independent seeds $X_j^1, X_j^2, X_j^3$ and $X_j^4$. Each seed $X_j^k$, k=1, . . . 4, generates a corresponding pseudo-random sequenced $c^{jk}$. The RFID sender S implements the following encryption scheme.

Let m be a total length in bits of the encapsulated encrypted message $s_j$ of $AP_2$, where m=nl+k, as defined previously, v be the total number of the watermarks $w_1, \ldots, w_v$ added to $s_{j_1}$ $d_{min}$ be a Hamming distance of the appropriate error detection code, and q be the number of redundant bits $r_1, \ldots, r_q$ used to extend the bits of the message defined by $AP_2$ to form a legal codeword. Actually, the total length of the key message $Y_j$ sent during any $j^{th}$ communication session is equal to t=m+q+v. The resulting t bits message is sent during the $j^{th}$ authentication session. $S_j$ has the following structure:

$$Y_j = \pi((b_j || \text{keyword}) \oplus (c_1^{j1}, \ldots, c_m^{j1}) || (r_1, \ldots r_q) \oplus (c^{j2}, \ldots, c_q^{j2}) || (w_1, \ldots, w_v)).$$

Here, $\pi$ determines the pseudo-random permutation of the concatenated string $((b_j||\text{keyword}) \oplus (c_1^{j1}, \ldots, c_m^{j1}) || (r_1, \ldots r_q) \oplus (c_1^{j2}, \ldots, c_q^{j2}) || (w_1, \ldots, w_v))$.

The basic random string $b_j$ concatenated with the keyword string is extended by error detection redundancy bits to form a legal codeword. The redundant bits $r_1, \ldots, r_q$ are located after the sub-string ($b_j$||keyword) in the message. The pseudo-random sequence $c^{j1}$ encapsulates the newly generated random string $b_j$ concatenated with the keyword string as in the $AP_2$ case. The pseudo-random sequence $c^{j2}$ generated from the seed $X_j^2$ encapsulates the redundant bits $r_1, \ldots, r_q$. The pseudo-random sequence $c^{j3}$ generated from the seed $X_j^3$ determines the watermarks $w_1, \ldots, w_v$ values that are located after the code redundant bits in the composed string message. $c^{j3}$ is created as v bits length sequence, while each watermark is 1 bit in length. Finally, the pseudo-random sequence $c^{j4}$ generated from the seed $X_j^4$ determines the pseudo-random permutation $\pi$ of the composed string that includes the string ($b_j$||keyword) encapsulated by $c^{j1}$, redundant bits $r_1, \ldots, r_q$ encapsulated by $c^{j3}$, and the unprotected watermarks. It should be remembered that $c^{j4}$ should produce a permutation for t=m+q+v bits length sequence (in fact $X_j^4$ may define a random permutation, rather than only a pseudo random permutation [5]).

The advantage of this approach is that the original string ($b_j$||keyword) and the corresponding redundant bits $r_1, \ldots, r_q$ are encapsulated and, therefore protected in an independent way. The redundant code that can be effective in the key string protection against IIMA must have a sufficiently large Hamming distance [16]. Assume that the adversarial goal is to corrupt the key message and to change the transmitted row that should update the vector B. In order to succeed in his/her attempt, the adversary must change the original string, that is, in essence a correct codeword, to another correct codeword string. The larger the code Hamming distance is, the smaller the probability for the adversary to succeed without changing watermarks.

Any linear block code with a large Hamming distance may fit. The great advantage of linear codes is that they can be easily implemented in hardware based on Linear Feed-Back Registers [16]. Since the schemes of the invention are based only on XOR and pseudo-random sequences, it is considered that the code that is based on the composition of log(nl) xor checks [12]. This code is defined as the composition of log(nl) parity checks while the redundant bits in each dimension are equal to the xor of the corresponding bits of the (b, keyword) string. The Hamming distance of this composed code is equal to log(nl)+1 [12]. The code's construction is as follows: the original string is represented as the log(nl)-dimensional hypercube while the redundant parity check bits are added in each dimension. The overhead of the redundant bits is equal to $q = \log(nl) \cdot {}^{\log(nl)+1}\sqrt{(nl)^{\log(nl)}}$.

The resistance against IIMA of the extended $\tilde{A}\tilde{P}_2$ protocol is proved by the following Lemma.

Lemma 1: $\tilde{A}\tilde{P}_2$ protocol is computationally secure against IIMA.

Proof: Assume that the adversary A has changed the bits of a certain message $s_j = Y_j$ that has been sent by the RFID sender S during the communication session $S_j$. In order to prove the lemma, evaluate the probability $P_A$ of the adversarial success.

Assume that the encryption scheme is well known to the adversary A. The unique information not recovered by A is the $X_j$ number and the seeds $X_j^1, X_j^2, X_j^3, X_j^4$ generated from it. The seed $X_j^4$ produces a pseudo-random sequence; hence, from the adversarial point of view any bit has the same probability of being a watermark. Therefore, the probability that A will corrupt a watermark while changing the bits of $s_j$ is equal to $$\alpha = \frac{v}{l}.$$

In order to successfully change the part of the original message $s_j$, the adversary A has to corrupt at least $d_{min}$ bits of $s_j$ that are the random bits of $(b_j || \text{keyword})$. Based on the assumption concerning the uniform distribution of the watermark bits, the probability of A succeeding is bounded by $P_A \leq (1-\alpha)^{d_{min}}$. $P_A$ may be as small as possible by choosing large enough vector B dimension n, number of the artificially inserted watermarks v, and number of redundant bits q used to obtain a large Hamming distance $d_{min}$ between any two codewords.

Note that there is a trade-off between the n; k; v; l; and $d_{min}$ values and minimization of $P_A$. Consider the following example. Assume that the artificially inserted watermarks occupy half of the encrypted message providing $$\alpha = \frac{1}{2}.$$

Assume that the redundant code is the composition of log(nl) XOR-based parity check codes. Then the code minimal distance is $d_{min} = \log(nl)+1$. The probability $P_A$ of the adversarial success is evaluated as:

$$P_A \leq \left(\frac{1}{2}\right)^{\log(nl)+1} = \frac{1}{2 \cdot n \cdot l}.$$

For large enough n and l, $P_A$ will be negligible.

The $AP_2$ protocol assumes that if the adversary was not listening in at least for a single session among n consecutive sessions between the RFID sender and the RFID receiver the proposed protocol automatically becomes information and computationally secure and, therefore the original security level of $AP_1$ is established. Thus, an adversary that starts processing the communication information in order to break the computational based scheme will have to start from scratch after any session it did not listen in. This fact can be used, in turn, to reduce the number of random bits used with relation to an only computational secure scheme.

The computational security of $AP_2$ is provided by involving basic arithmetic operations and using small size memory. The larger are the values of the vector B entries, the larger is its XOR $X_j$ value and, consequently the generated pseudo-random sequence is closer to a real random sequence ([13]). The updated protocol $\tilde{A}\tilde{P}_2$ provides computationally secure resistance also against IIMAs, loosening the session atomicity assumption. Its computational security power strictly depends on n the size of the vector B, the overhead of the artificially inserted watermarks, and error detection power of the redundant code. Note that the invention can use a symmetric authentication scheme to obtain mutual authentication of the sender and the receiver. For example, the number of entries in the vectors of the sender and the receiver can be doubled and use the XOR of one entry to authenticate the sender and the xor of the next entry to authenticate the receiver. Obviously, the computational security "envelop" can be implemented for the symmetric version as well, resulting in a proactive computational secure symmetric scheme.

The invention can also be implemented in a product. In particular, a computer readable medium for an RFID sender can be provided that contains executable instructions for initializing the sender with (i) an initial array $B=a[1 \ldots n]$, (ii) i=1 and (iii) a keyentry=n-(i-1)mod n; for creating by sender, responsive to receiving power from a reader, a new random array b, and a key X=a[keyentry]; for calculating a key message by sender as s=(X,b) and for sending key message to a receiver; and for updating the sender with said new random array b. The executable instructions may include instructions for generating a new random vector b for updating vector B, instructions for updating comprises setting a[keyentry]=0, and for (j=1; j++; j<n), a[j]=a[j]⊕b[j]; and incrementing 1, instructions for initializing sender with keywords, and executable instructions for creating pseudo-random sequence prs of length m. In one embodiment of the invention, the instructions can include executable instructions for calculating from seed X[keyentry] ⊕ seed, Y=((b||keyword)⊕ prs), and sending to receiver. In another embodiment, the instruction can include executable instructions for dividing the seed X into four independent seeds $X_j^1, X_j^2, X_j^3$, and $X_j^4$, with each seed $X^{jk}$, k=1, . . . 4, generating a corresponding pseudo-random sequenced $c^{jk}$. Also, instructions can include executable instructions for adding watermarks to message sent to receiver. In another particular embodiment, the instructions can include executable instructions for sending the message to receiver with the following structure $$Y_j = \pi((b_j || \text{keyword}) \oplus (c_1^{j1}, \ldots, c_m^{j1}) || (r_1, \ldots r_q) \oplus (c_1^{j2}, \ldots, c_q^{j2}) || (w_1, \ldots, w_v)).$$

wherein π determines the pseudo-random permutation of the concatenated string $((b_j || \text{keyword}) \oplus (c_1^{j1}, \ldots, c_m^{j1}) || (r_1, \ldots r_q) \oplus (c_1^{j2}, \ldots, c_q^{j2}) || (w_1, \ldots, w_v))$, the random string $b_j$ concatenated with the keyword string extended by error detection redundancy bits $r_1, \ldots, r_q$ to form a legal codeword, and the pseudo-random sequence $c^{j2}$ being generated from the seed $X_j^2$ encapsulating the redundant bits $r_1, \ldots, r_q$, with the pseudo-random sequence $c^{j3}$ being generated from the seed $X_j^3$ determining the watermarks $w_1, \ldots, w_v$ values that are located after the code redundant bits in the composed string message, and $c^{j3}$ being created as v bits length sequence, while each watermark is 1 bit in length and the pseudo-random sequence $c^{j4}$ being generated from the seed $X_j^4$ determining the pseudo-random permutation π of the composed string that includes the string $(b_j\|keyword)$ encapsulated by $c^{j1}$, redundant bits $r_1, \ldots, r_q$ encapsulated by $c^{j3}$, and the unprotected watermarks.

In a separate embodiment of the invention the product can comprise a computer readable medium for an RFID receiver containing executable instructions for initializing the receiver with (i) an initial array $B=a[1 \ldots n]$, (ii) $l=1$ and (iii) a keyentry=n−(i−1)mod n; for creating by receiver, responsive to receiving from a sender, a key message $s=(X,b)$, wherein b is a new random array b, and a key $X=a[keyentry]$; for determining if key message sent by sender contains $X=a[keyentry]$, and if so, sending positive message to sender, and if not so, sending negative message to sender; and for updating receiver with said new random array b. A new random vector b can be used to update vector B. The computer readable medium can include executable instructions for updating comprises setting $a[keyentry]=0$, and for $(j=1; j++; j<n)$, $a[j]=a[j]\oplus[j]$; and incrementing l, and/or instructions for initializing receiver with keywords. The computer readable medium for the RFID receiver can including executable instructions for creating pseudo-random sequence prs of length m, and can include executable instructions for calculating from seed $X[keyentry] \oplus$ seed, $Y=((b\|keyword)\oplus prs)$, and for determining if $Z[(n+1) \ldots m]\epsilon keywords$, and if so, to send positive message to sender, and if not so, to send negative message to sender. The instructions can include executable instructions for determining watermarks in message sent to receiver. In a particular embodiment, the computer readable medium can include executable instructions for receiving a message with the following structure $$Y_j = \pi((b_j\|keyword)\oplus(c_1^{j1}, \ldots, c_m^{j1})\|(r_1, \ldots r_q)\oplus (c_1^{j2}, \ldots, c_q^{j2})\|(w_1, \ldots, w_v)).$$

wherein $\pi$ determines the pseudo-random permutation of the concatenated string $((b_j\|keyword)\oplus(c_1^{j1}, \ldots, c_m^{j1})\| (r_1, \ldots r_q)\oplus(c_1^{j2}, \ldots, c_q^{j2})\|(w_1, \ldots, w_v))$, the random string $b_j$ concatenated with the keyword string extended by error detection redundancy bits $r_1, \ldots r_q$ to form a legal codeword, and the pseudo-random sequence $c^{j2}$ being generated from a seed $X_j^2$ encapsulating redundant bits $r_1, \ldots, r_{q_1}$, with the pseudo-random sequence $c^{j3}$ being generated from a seed $X_j^3$ determining watermarks $w_1, \ldots, w_v$ values that are located after the code redundant bits in the composed string message, and $c^{j3}$ being created as v bits length sequence, while each watermark is 1 bit in length and the pseudo-random sequence $c^{j4}$ being generated from a seed $X_j^4$ determining the pseudo-random permutation $\pi$ of the composed string that includes the string $(b_j\|keyword)$ encapsulated by $c^{j1}$ redundant bits $r_1, \ldots, r_q$ encapsulated by $c^{j3}$, and the unprotected watermarks.

In a further embodiment of the product invention, the computer readable medium of the RFID sender and the receiver can include instructions for the sender to send only O(log n) new random numbers out of the n numbers of the vector in each communication session, where the sender chooses randomly O(log n) distinct indices in the range 1 to n and to send the chosen indices together with a vector of O(log n) randomly chosen numbers. The instructions include using the chosen indices to update the vectors B of the sender and the receiver, to reduce the number sent and the number of updates in each session from n to O(log n).

The $AP_1$ and $AP_2$ protocols can be used in the case of multiple RFID senders and a single or multiple RFID receiver(s). In order to provide secure one way or two ways authentication and communication the RFID receiver has to store different vectors and to share unique vectors with each RFID sender. As a matter of fact, the limitations imposed on the number of RFID senders is only related to any limitations on the storage capabilities of the RFID receiver.

Although the invention has been described in terms of preferred embodiments, nevertheless changes and modification will be apparent to persons of skill in the art which do not depart from the teachings of the present invention. Such changes and modifications of the present invention are deemed to fall within the purview of the invention as claimed.

REFERENCES

1. G. Avoine, "Radio Frequency Identification: Adversary Model and Attacks on Existing Protocols", Technical Report LASES-REPORT-2005-001, September 2005.
2. D. Bonen, J. Shaw, "Collusion-Secure Fingerprinting for Digital Data", IEEE Transactions on Information Theory, Vol 44, No. 5, pp. 1897 {1905, 1998.
3. S. Bono, M. Green, A. Stubblefield, A. Juels, A. Rubin, M. Szydlo, "Security Analysis of a Cryptographically Enabled RFID Device", P. McDaniel, ed., USENIX Security 05, pp. 1-16, 2005.
4. R. Canetti, Rosario Gennaro, A. Herzberg, D. Naor, "Proactive Security: Longterm Protection Against Break-ins", RSA CryptoBytes, No. 1, Vol. 3, p.p. 1-8, 1997.
5. S. Dolev, L. Lahiani, Y. Haviv, "Unique Permutation Hashing", Technical Report, Computer Science, Ben-Gurion University, 2007.
6. S. Dolev, M. Kopeetsky, "Secure Communication for RFIDs. Proactive Information Security within Computational Security", Eighth International Symposium on Stabilization, Safety, and Security of Distributed Systems, Dallas, USA, 2006.
7. Dang Nguyen Duc, Kwangjo Kim, "Securing HB+ against GRS Man-in-the-Middle Attack", The 2007 Symposium on Cryptography and Information Security (SCIS 2007), Japan, 2007.
8. R. Goossens, F. Lambi, "RFID Society Newsletter", http://informationweek.com/story/showArticle.jhtml?articleID=163101002, May, 2005.
9. A. Juels, "Strengthening EPC Tags Against Cloning", ACM Workshop on Wireless Security, pp. 67-76, 2005.
10. A. Juels, "RFID Security and Privacy: A Research Survey", RSA Laboratories http://www.rsasecurity.com/rsal-abs/node.asp?id=2937, Condensed version to appear in 2006 in the IEEE Journal on Selected Areas in Communication.
11. A. Juels, "Minimalist Cryptography for Low-Cost RFID Tags", RSA Laboratories http://www.rsasecurity.com/rsalabs/node.asp?id=2937. In C. Blundo, ed., Security of Communication Networks (SCN), 2004. To appear.
12. F. J. MacWilliams, N. J. A. Sloane, "The Theory of Error Correcting Codes", North-Holland Publishing Company, 1977.
13. A. Menezes, P. van Oorschot, S. Vanstone, "Handbook of Applied Cryptography", CRC Press, 1-st edition, 1996.
14. S. E. Sarma, S. A. Weis, D. W. Engels, "Radio-Frequency Identification: Security Risks and Challenges", RSA CryptoBytes, No. 1, Vol. 6, 2003.
15. D. R. Stinson, "Cryptography Theory and Practice", CRC Press, 3-rd edition, 2006.
16. R. Togneri, C. J. S. deSilva, "Fundamentals of Information Theory and Coding Design", Chapman and Hall/CRC, 2002.

What is claimed is:

1. A method for maintaining secure communication between a passive RFID tag including circuitry having stored therein object identifying data, and an interfacing RFID reader containing circuitry to read and write tag data and which is connectable with a back-end processor and database that aggregates and utilizes tag data collected by the RFID reader from the RFID tag comprising the steps of:
   a. initializing both the RFID reader and the RFID tag with (i) an initial array $B=a[1 \ldots n]$, (ii) $i=1$ and (iii) a keyentry=$n-(i-1)\bmod n$;
   b. creating by the RFID tag a new random vector b, and seed $X=a[\text{keyentry}]$;
   c. calculating a key message by the RFID tag as $s=(X,b)$ and sending the key message to the RFID reader wherein watermarks are added to the message sent by the RFID tag to the RFID reader;
   d. receiving the key message by the RFID reader and calculating if $X=a[\text{keyentry}]$, and if so, sending a positive message to the RFID tag, and if not so, sending a negative message to RFID tag; and
   e. initiating an action by the RFID tag responsive to receiving a positive message.

2. The method according to claim 1 including the further step of updating the RFID tag and the RFID reader with a new random array b in response to sending a positive message to sender.

3. The method according to claim 1 including the further step of updating vector B of both the RFID tag and the RFID reader with a new random vector b.

4. The method according to claim 3 wherein updating step comprises setting $a[\text{keyentry}]=0$, and for $(j=1; j{++}; j<n)$, $a[j]=a[j] \oplus b[j]$; and incrementing i.

5. The method according to claim 1 including the further step of defining to the RFID tag and the RFID reader a set of k-bit length keywords.

6. The method according to claim 5 including the further step of the RFID tag creating pseudo-random sequence prs of length m.

7. The method according to claim 6 including the further step of the RFID tag determining from seed $X[\text{keyentry}] \oplus$ seed, $Y=(b\|\text{keyword}) \oplus \text{prs}))$, and sending to the RFID reader; and the RFID reader calculating $Z=Y \oplus \text{prs}$ and determining if $Z[n+1 \ldots m] \in$ keywords, and if so, sending positive message to the RFID tag, and if not so, sending negative message to the RFID tag.

8. The method according to claim 7 wherein the seed X is divided into four independent seeds $X^1, X^2, X^3$, and $X^4$, with each seed $X^k$, $k=1, \ldots 4$, generating a corresponding pseudo-random sequence $c^{jk}$.

9. The method according to claim 8 wherein the message sent to the RFID reader has the following structure $$Y_j = \pi((b_j\|\text{keyword}[k]) \oplus (c_1^{j1}, \ldots, c_m^{j1}) \| (r_1, \ldots r_q) \oplus (c_1^{j2}, \ldots, c_q^{j2}) \| (w_1, \ldots, w_v)).$$

wherein $\pi$ determines the pseudo-random permutation of the concatenated string, the random string $b_j$ concatenated with the keyword string keyword extended by error detection redundancy bits $r_1, \ldots, r_q$ to form a legal codeword, and the pseudo-random sequence $c^{j2}$ being generated from the seed encapsulating the redundant bits $r1, \ldots, rq$, with the pseudo-random sequence being generated from the seed $X_j^2$ determining the watermarks $w_1, \ldots, w_v$ values that are located after the code redundant bits in the composed string message, and $c^{j3}$ being created as v bits length sequence, while each watermark is 1 bit in length and the pseudo-random sequence $c^{j4}$ being generated from the seed $X_j^4$ determining the pseudo-random permutation $\pi$ of the composed string that includes the string ($b_j$ keyword) encapsulated by $c^{j1}$, redundant bits $r_1, \ldots, r_q$ encapsulated by $c^{j3}$, and the watermarks.

10. An RFID secure communication system comprising an RFID tag and an RFID reader both configured for being initialized with (i) an initial array $B=a[1 \ldots n]$, (ii) $i=1$ and (iii) a keyentry=$n-(i-1)\bmod n$; the RFID tag being further configure for creating a new random array b, and a key $X=a[\text{keyentry}]$ and for calculating a key message to be sent by the RFID tag to the RFID reader, the key message composed as $s=(X,b)$ and for sending the key message to the RFID reader wherein watermarks are added to the message sent by the RFID tag to the RFID reader; the RFID reader being further configured for receiving the key message and for calculating if $X=a[\text{keyentry}]$, and if so, sending a positive message to the RFID tag, and if not so, sending a negative message to the RFID tag; and the RFID tag being further configured for initiating an action responsive to receiving a positive message.

11. The RFID secure communication system according to claim 10 wherein the RFID tag and the RFID reader are further configured to be updated with a new random array b responsive to the RFID tag receiving a positive message.

12. The RFID secure communication system according to claim 10 wherein the RFID tag and the RFID reader are configured to store a matrix B and for replacing a vector in Matrix B with a new random array b.

13. The RFID secure communication system according to claim 11 wherein the updating comprises setting $a[\text{keyentry}]=0$, and for $(j=1; j{++}; j<n)$, $a[j]=a[j] \oplus b[j]$; and incrementing i.

14. The RFID secure communication system according to claim 10 wherein the RFID tag and the RFID reader are configured to be initialized with keyword to provide operational mode.

15. The RFID secure communication system according to claim 14 wherein the RFID tag is configured to create pseudo-random sequence of prs of length m for enhanced security.

16. The RFID secure communication system according to claim 15 wherein the RFID tag is configured to calculate from seed $X[\text{keyentry}] \oplus$ seed, $Y=(b\|\text{keyword} \oplus \text{prs})$, and to send to the RFID reader; and the RFID reader is configured to calculate $Z=Y \oplus \text{prs}$, and to determine if $Z[n+1 \ldots m] \in$ keywords, and if so, to send positive message to the RFID tag, and if not so, to send negative message to the RFID tag.

17. The RFID secure communication system according to claim 16 the RFID tag is configured for dividing the seed X into four independent seeds $X_j^1, X_j^2, X_j^3$ and $X_j^4$, with each seed $X_j^k$, $k=1, \ldots 4$, and for generating a corresponding pseudo-random sequence $c^{jk}$.

18. The RFID secure communication system according to claim 17 wherein the message sent to the RFID reader has the following structure $$Y_j = \pi((b_j\|\text{keyword}) \oplus (c_1^{j1}, \ldots, c_m^{j1}) \| (r_1, \ldots r_q) \oplus (c_1^{j2}, \ldots, c_q^{j2}) \| (w_1, \ldots, w_v)),$$

wherein $\pi$ determines the pseudo-random permutation of the concatenated string $((b_j\|\text{keyword}[k]) \oplus (c_1^{j1}, \ldots, c_m^{j1}) \| (r_1, \ldots r_q) \oplus (c_1^{j2}, \ldots, c_q^{j2}) \| (w_1, \ldots, w_v))$, the random string $b_j$ concatenated with the keyword string keyword extended by error detection redundancy bits $r_1, \ldots, r_q$ to form a legal codeword, and the pseudo-random sequence $c^{j2}$ being generated from the seed $X_j^2$ encapsulating the redundant bits $r_1, \ldots, r_q$, with the pseudo-random sequence $c^{j3}$ being generated from the seed $X_j^3$ determining the watermarks $w_1, \ldots, w_v$ values that are located after the code redundant bits in the composed string message, and $c^{j3}$ being created as v bits length sequence, while each watermark is 1 bit in length and the pseudo-random sequence $c^{j4}$ being generated from the seed $X_j^4$ determining the pseudo-random permutation $\pi$ of the composed string that includes the string ($b_j$ keyword) encapsulated by $c^{j1}$, redundant bits $r_1, \ldots, r_q$ encapsulated by $c^{j3}$, and the watermarks.

19. A non-transitory computer readable medium for an RFID tag having a processor of an RFID secure communication system comprised of the RFID tag and an RFID reader, said medium containing non-transient executable instructions that program the processor contained in the RFID tag for initializing the RFID tag with (i) an initial array B=a[1 . . . n], (ii) i=1 and (iii) a keyentry=n−(i−1)mod n; for creating in responsive to receiving request from a RFID reader, a new random array b, and a key X=a[keyentry]; for calculating a key message as s=(X,b) and for sending the key message to the RFID reader wherein watermarks are added to the message sent by the RFID tag to the RFID reader; and for updating the RFID tag with said new random array b.

20. The non-transitory computer readable medium according to claim 19 wherein the non-transient executable instructions include for generating a new random vector b for updating vector B.

21. The non-transitory computer readable medium according to claim 20 including non-transient executable instructions for updating comprises setting a[keyentry]=0, and for (j=1; j++; j<n), a[j]=a[j] $\oplus$ b[j]; and incrementing i.

22. The non-transitory computer readable medium according to claim 19 including non-transient executable instructions for initializing the RFID tag with keywords.

23. The non-transitory computer readable medium according to claim 22 including non-transient executable instructions for creating pseudo-random sequence prs of length m.

24. The non-transitory computer readable medium according to claim 23 including non-transient executable instructions for calculating from seed X[keyentry] $\oplus$ seed, Y=((b||keyword) $\oplus$ prs, and sending to a RFID reader.

25. The non-transitory computer readable medium according to claim 24 including non-transient executable instructions for dividing the seed X into four independent seeds $X_j^1$, $X_j^2$, $X_j^3$ and $X_j^4$, with each seed $X_j^k$, k=1, . . . 4, generating a corresponding pseudo-random sequence $c^{jk}$.

26. The non-transitory computer readable medium according to claim 25 including non-transient executable instructions for sending the message to the RFID reader with the following structure $$Y_j=\pi((b_j\|\text{keyword}[k])\oplus(c_1^{j1},\ldots,c_m^{j1})\|(r_1,\ldots r_q)\oplus (c_1^{j2},\ldots,c_q^{j2})\|(w_1,\ldots,w_v)).$$

wherein $\pi$ determines the pseudo-random permutation of the concatenated string $((b_j\|\text{keyword}[k])\oplus(c_1^{j1},\ldots,c_m^{j1})\|(r_1,\ldots r_q)\oplus(c_1^{j2},\ldots,c_q^{j2})\|(w_1,\ldots,w_v))$, the random string $b_j$ concatenated with the keyword string keyword extended by error detection redundancy bits $r_1, \ldots, r_q$ to form a legal codeword, and the pseudo-random sequence $c^{j2}$ being generated from the seed $X_j^2$ encapsulating the redundant bits $r_1, \ldots, r_q$, with the pseudo-random sequence $c^{j3}$ being generated from the seed $X_j^3$ determining the watermarks $w_1, \ldots, w_v$ values that are located after the code redundant bits in the composed string message, and $c^{j3}$ being created as v bits length sequence, while each watermark is 1 bit in length and the pseudo-random sequence $c^{j4}$ being generated from the seed $X_j^4$ determining the pseudo-random permutation $\pi$ of the composed string that includes the string ($b_j$ keyword) encapsulated by $c^{j1}$, redundant bits $r_1, \ldots, r_q$ encapsulated by $c^{j3}$, and the watermarks.

27. A non-transitory computer readable medium for an RFID reader having a processor-of an RFID secure communication system comprised of the RFID reader and an RFID tag, said medium containing non-transient executable instructions that program the processor contained in the RFID reader for initializing the RFID reader with (i) an initial array B=a[1 . . . n], (ii) i=1 and (iii) a keyentry=n−(i−1)mod n; for creating by the RFID reader, responsive to receiving from the RFID tag, a key message s=(X,b), wherein b is a new random array b, and a key X=a[keyentry]; for determining if the key message by the RFID tag contains X=a[keyentry] and added watermarks, and if so, sending a positive message to the RFID tag, and if not so, sending a negative message to the RFID tag; and for updating the RFID reader with said new random array b.

28. The non-transitory computer readable medium according to claim 27 wherein new random vector b is used to update vector B.

29. The non-transitory computer readable medium according to claim 28 wherein non-transient executable instructions for updating comprises setting a[keyentry]=0, and for (j=1; j++; j<n), a[j]=a[j] $\oplus$ b[j]; and incrementing i.

30. The non-transitory computer readable medium according to claim 27 including non-transient executable instructions for initializing the RFID reader with keywords.

31. The non-transitory computer readable medium according to claim 30 including non-transient executable instructions for creating pseudo-random sequence prs of length m.

32. The non-transitory computer readable medium according to claim 31 including non-transient executable instructions for calculating from seed X[keyentry] $\oplus$ seed, Y=(b||keyword $\oplus$ prs), and for determining Z[n+1 . . . m] $\in$ keywords, and if so, to send positive message to RFID tag, and if not so, to send negative message to RFID tag.

33. The non-transitory computer readable medium according to claim 32 including non-transient executable instructions for receiving a message with the following structure $$Y_j=\pi((b_j\|\text{keyword}[k])\oplus(c_1^{j1},\ldots,c_m^{j1})\|(r_1,\ldots r_q)\oplus (c_1^{j2},\ldots,c_q^{j2})\|(w_1,\ldots,w_v))$$

wherein $\pi$ determines the pseudo-random permutation of the concatenated string $((b_j\|\text{keyword}[k])\oplus(c_1^{j1},\ldots,c_m^{j1})\|(r_1,\ldots r_q)\oplus(c_1^{j2},\ldots,c_q^{j2})\|(w_1,\ldots,w_v))$, the random string bj concatenated with the keyword string extended by error detection redundancy bits $r_1, \ldots, r_q$ to form a legal codeword, and the pseudo-random sequence $c^{j2}$ being generated from a seed $X_j^2$ encapsulating redundant bits $r_1, \ldots, r_q$, with the pseudo-random sequence $c^{j3}$ being generated from a seed $X_j^3$ determining watermarks $w_1, \ldots, w_v$ values that are located after the code redundant bits in the composed string message, and $c^{j3}$ being created as v bits length sequence, while each watermark is 1 bit in length and the pseudo-random sequence $c^{j4}$ being generated from a seed $X_j^4$ determining the pseudo-random permutation $\pi$ of the composed string that includes the string ($b_j$ keyword) encapsulated by $c^{j1}$, redundant bits $r_1, \ldots, r_q$ encapsulated by $c^{j3}$, and the watermarks.

34. The method according to claim 7 wherein the RFID tag sends only O(log n) new random numbers out of the n numbers of the vector in each communication session with the RFID reader, and wherein the RFID tag chooses randomly O(log n) distinct indices in the range 1 to n and sends to the RFID reader the chosen indices together with a vector of O(log n) randomly chosen numbers, and wherein the chosen indices are used to update the vectors B of the RFID tag and the RFID reader, reducing the number sent and the number of updates in each sessions from n to O(log n).

35. The RFID secure communication system according to claim 16, wherein the RFID tag sends only O(log n) new random numbers out of the n numbers of the vector in each communication session with the RFID reader, wherein the RFID tag chooses randomly O(log n) distinct indices in the range 1 to n and sends the chosen indices together with a vector of O(log n) randomly chosen numbers, and wherein the chosen indices are used to update the vectors B of the RFID tag and the RFID reader, reducing the number sent and the number of updates in each session from n to O(log n).

36. The non-transitory computer readable medium according to claim 24 wherein the non-transient executable instructions program the RFID tag to send only O(log n) new random numbers out of the n numbers of the vector in each communication session, for the RFID tag to choose randomly O(log n) distinct indices in the range 1 to n, for sending the chosen indices together with a vector of O(log n) randomly chosen numbers, for the chosen indices to be used to update the vectors B of the RFID tag and the RFID reader to reduce the number sent and the number of updates in each session from n to O(log n).

37. The non-transitory computer readable medium according to claim 32 wherein the non-transient executable instructions program the RFID reader to receive from the RFID tag only O(log n) new random numbers out of the n numbers of the vector in each communication session, for the receiver to receive from the RFID tag randomly chosen O(log n) distinct indices in the range 1 to n sent together with a vector of O(log n) randomly chosen numbers, and for using the chosen indices to update the vectors B of the RFID reader, to reduce the number sent and the number of updates in each session from n to O(log n).

* * * * *